US012802639B2

(12) United States Patent
Furukawa et al.

(10) Patent No.: US 12,802,639 B2
(45) Date of Patent: Nov. 17, 2026

(54) CONTROL DEVICE AND DISPLAY DEVICE

(71) Applicant: Sharp Display Technology Corporation, Kameyama City (JP)

(72) Inventors: Hiroyuki Furukawa, Sakai City (JP); Masafumi Ueno, Sakai City (JP); Chie Toridono, Sakai City (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 19/108,616

(22) PCT Filed: Sep. 9, 2022

(86) PCT No.: PCT/JP2022/033936
§ 371 (c)(1),
(2) Date: Mar. 4, 2025

(87) PCT Pub. No.: WO2024/053105
PCT Pub. Date: Mar. 14, 2024

(65) Prior Publication Data

US 2026/0080824 A1 Mar. 19, 2026

(51) Int. Cl.
*G09G 3/3233* (2016.01)
*G09G 3/20* (2006.01)

(52) U.S. Cl.
CPC ......... *G09G 3/3233* (2013.01); *G09G 3/2014* (2013.01); *G09G 2300/0852* (2013.01); *G09G 2320/0247* (2013.01); *G09G 2320/0271* (2013.01)

(58) Field of Classification Search
None
See application file for complete search history.

(56) References Cited

U.S. PATENT DOCUMENTS

| | | | |
|---|---|---|---|
| 2006/0103611 | A1 | 5/2006 | Choi |
| 2010/0053042 | A1 | 3/2010 | Kajiyama et al. |
| 2012/0249615 | A1 | 10/2012 | Lee |
| 2014/0035974 | A1 | 2/2014 | Jinta et al. |

FOREIGN PATENT DOCUMENTS

| | | | |
|---|---|---|---|
| JP | 2000-250456 | A | 9/2000 |
| JP | 2006-146201 | A | 6/2006 |
| JP | 2010-060648 | A | 3/2010 |
| JP | 2012-208459 | A | 10/2012 |
| JP | 2014-029437 | A | 2/2014 |
| WO | 2020/071595 | A1 | 4/2020 |

*Primary Examiner* — Nicholas J Lee
(74) *Attorney, Agent, or Firm* — ScienBiziP, P.C.

(57) ABSTRACT

In a period during which a write period and a light emission period are alternately repeated, a timing control unit included in a control device writes data to a first drive circuit group based on input image data during the write period, causes multiple first light-emitting elements to emit light during the light emission period, and causes multiple second light-emitting elements to emit light during at least part of the write period.

17 Claims, 37 Drawing Sheets

CONTROL DEVICE AND DISPLAY DEVICE

TECHNICAL FIELD

The disclosure relates to a control device and a display device.

BACKGROUND ART

In recent years, control devices for display panels including light-emitting elements and display devices including the display panels and the control devices have been actively developed. For example, display panels including light-emitting elements such as quantum dot light-emitting diodes (QLEDs), organic light-emitting diodes (OLEDs), μLEDs, or mini-LEDs have attracted much attention because these display panels can achieve low power consumption, thickness reduction, high image quality, and the like.

Methods and control devices for driving display panels including these light-emitting elements are also being actively developed.

For example, WO 2020/071595 A1 discloses a pulse width modulation (PWM) drive method that controls luminance by constantly applying a constant voltage between both electrodes of a light-emitting element to keep an amount of current flowing through the light-emitting element constant, while changing current flow time, regardless of a gray scale value of input image data. The PWM drive method for controlling luminance is an example of a drive method in which one frame period is divided into a write period and a light emission period, writing is performed to multiple drive circuits, each of which includes a light-emitting element, located in a display panel during the write period, and the multiple light-emitting elements included in the display panel are caused to emit light during the light emission period.

PTL 1: WO 2020/071595 A1

SUMMARY

Technical Problem

However, in the case of the drive method described in WO 2020/071595 A1, the multiple light-emitting elements included in the display panel are driven so as to emit light only during the light emission period out of the write period that does not involve light emission and the light emission period that does not involve writing, and all the light-emitting elements included in the display panel are turned off during the write period. Therefore, in the case of the display panel driven by the drive method described in WO 2020/071595 A1, flicker generation is unavoidable.

One method to reduce such flicker is, for example, to double a frame frequency for driving the display panel and halve a length of one frame period. However, when the frame frequency for driving the display panel is increased in this manner, the above-described write period is also shortened accordingly, thereby making it necessary to further increase the speed of data writing. Thus, it becomes necessary to include a drive IC capable of high-speed driving and transistors and capacitors capable of stable high-speed writing in a drive circuit including a light-emitting element.

One aspect of the disclosure has been made in consideration of the above-described problems, and aims to provide a control device and a display device that can suppress flicker without increasing a frame frequency for driving a display panel.

Solution to Problem

In order to solve the above problems, a control device according to the disclosure is a control device for a display panel in which multiple display units each including a first light-emitting element and a second light-emitting element are arranged along n rows and m columns, where m and n are natural numbers of two or more, the display panel including multiple first drive circuits each including the first light-emitting element, the control device including a control unit configured to cause the display panel to display an image based on input image data, wherein the control unit, in a period during which a write period and a light emission period are alternately repeated, performs writing of data to the multiple first drive circuits based on the input image data, during the write period, causes the multiple first light-emitting elements to emit light during the light emission period, and causes the multiple second light-emitting elements to emit light during at least part of the write period.

Advantageous Effects of Disclosure

One aspect of the disclosure can provide a control device and a display device that can suppress flicker without increasing a frame frequency for driving a display panel.

DESCRIPTION OF EMBODIMENTS

Figure 1:
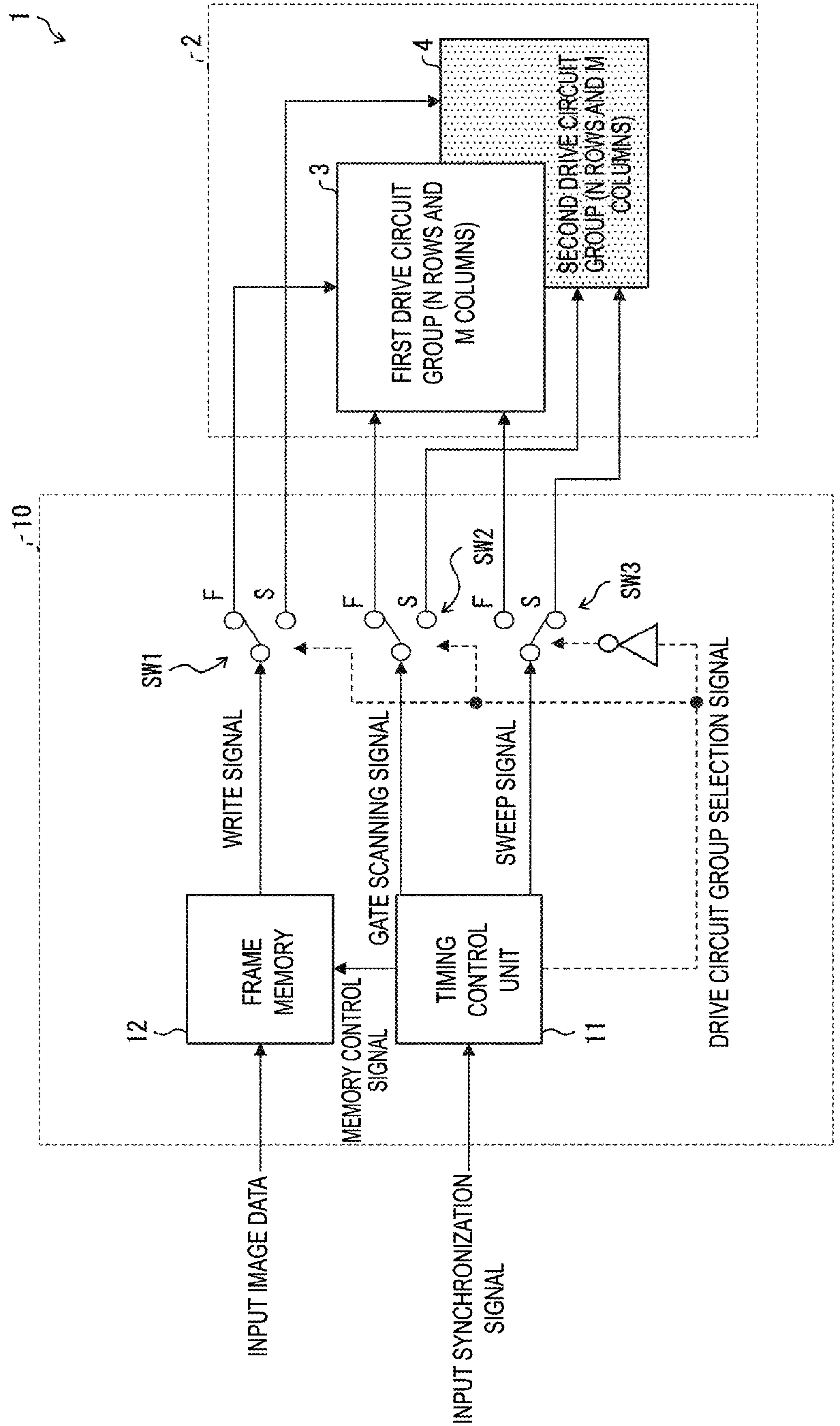
FIG. 1 is a diagram illustrating a schematic configuration of a display panel and a control device included in a display device according to a first embodiment, and is a diagram illustrating a state of the control device during a write period to a first drive circuit group and during a light emission period of a second light-emitting element group included in the display panel.

Embodiments of the disclosure will be described with reference to FIGS. 1 to 37 as follows. Hereinafter, for convenience of description, configurations having the same functions as those described in a specific embodiment are denoted by the same reference numerals and signs, and descriptions thereof will be omitted.

First Embodiment

A first embodiment of the disclosure will be described with reference to FIGS. 1 to 13. In a display panel 2 included in a display device 1 according to the present embodiment and in display panels 2*a*, 2*b*, 2*c*, and 2*d* that can be included in the display device 1 according to the present embodiment, a case will be described as an example in which one display unit DU and one display unit DU' each include one first light-emitting element 3*a* and one second light-emitting element 4*a*, but this case is just an example, and it is sufficient that one display unit DU and one display unit DU' each include at least one first light-emitting element 3*a* and at least one second light-emitting element 4*a*.

In the display panel 2 included in the display device 1 according to the present embodiment and the display panel 2*a* that can be included in the display device 1 according to the present embodiment described with reference to FIGS. 1 to 9, the first light-emitting element 3*a* and the second light-emitting element 4*a* at least partially overlap in a plan view, while in the display panels 2*b*, 2*c*, and 2*d* that can be included in the display device 1 according to the present embodiment described with reference to FIGS. 10 to 13, the first light-emitting elements 3*a* and 3*a*' and the second light-emitting elements 4*a* and 4*a*' do not overlap in a plan view, respectively.

In the present embodiment, a case will be described as an example in which the first light-emitting elements 3*a* and 3*a*' and the second light-emitting elements 4*a* and 4*a*' included in one display unit DU and one display unit DU', respectively, are light-emitting elements that emit light of the same color, and one display unit DU and one display unit DU' are subpixels.

In the present embodiment, a case will be described as an example in which the first light-emitting elements 3*a* and 3*a*' and the second light-emitting elements 4*a* and 4*a*' included in one display unit DU and one display unit DU', respectively, are each pulse width modulation (PWM) driven to control luminance by keeping an amount of current flowing through the light-emitting element constant and changing a current flow time, but this case is just an example.

FIG. 1 is a diagram illustrating a schematic configuration of the display panel 2 and a control device 10 included in the display device 1 according to the first embodiment, and is a diagram illustrating a state of the control device 10 during a write period to a first drive circuit group 3 and a light emission period of a second light-emitting element group included in the display panel 2.

Figure 2:
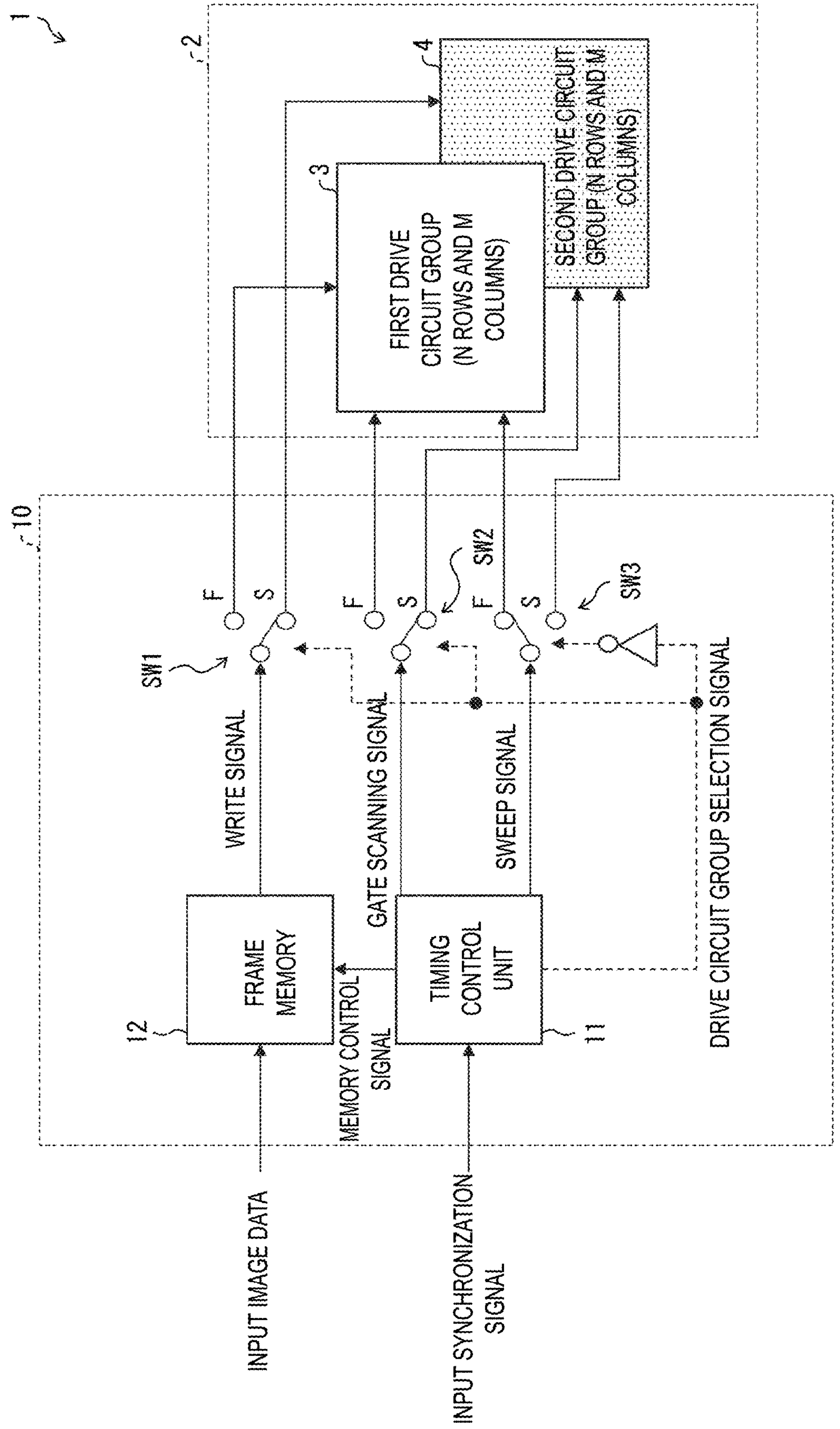
FIG. 2 is a diagram illustrating a schematic configuration of the display panel and the control device included in the display device according to the first embodiment, and is a diagram illustrating a state of the control device during a write period to a second drive circuit group and during a light emission period of a first light-emitting element group included in the display panel.

FIG. 2 is a diagram illustrating a schematic configuration of the display panel 2 and the control device 10 included in the display device 1 according to the first embodiment, and is a diagram illustrating a state of the control device 10 during a write period to a second drive circuit group 4 and a light emission period of a first light-emitting element group included in the display panel 2.

Figure 3:
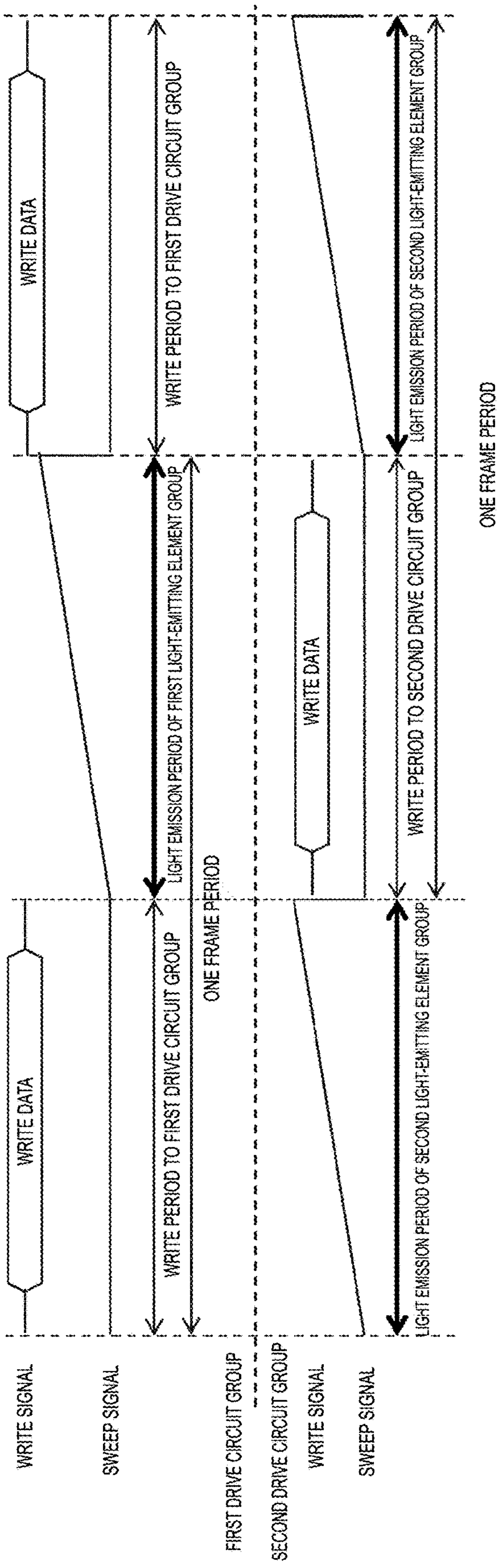
FIG. 3 is a diagram illustrating an example of a drive timing for driving the display panel included in the display device according to the first embodiment.

FIG. 3 is a diagram illustrating an example of a drive timing for driving the display panel 2 included in the display device 1 according to the first embodiment.

Figure 4:
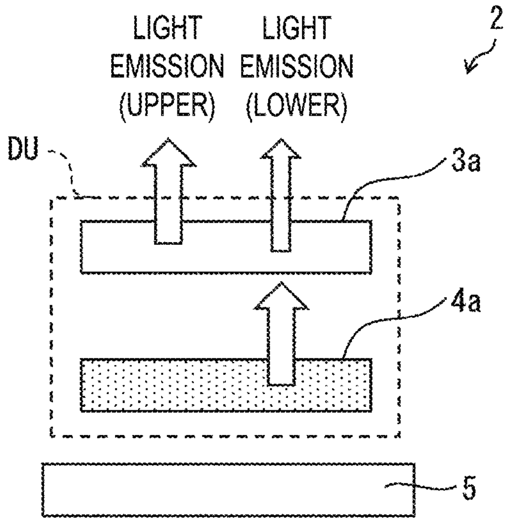
FIG. 4 is a diagram illustrating a schematic configuration of a display unit of the display panel included in the display device according to the first embodiment.

FIG. 4 is a diagram illustrating a schematic configuration of the display unit DU of the display panel 2 included in the display device 1 according to the first embodiment.

Figure 5:
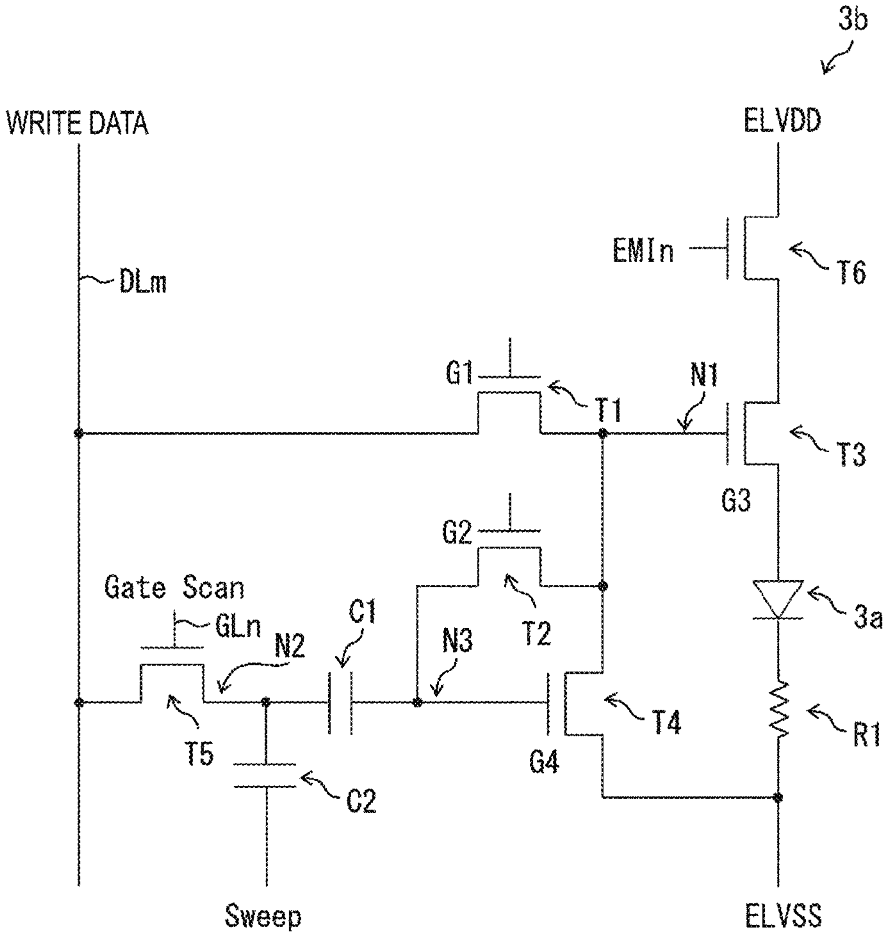
FIG. 5 is a circuit diagram illustrating a schematic configuration of a first drive circuit included in the display panel included in the display device according to the first embodiment.

FIG. 5 is a circuit diagram illustrating a schematic configuration of a first drive circuit 3*b* included in the display panel 2 included in the display device 1 according to the first embodiment.

Figure 8:
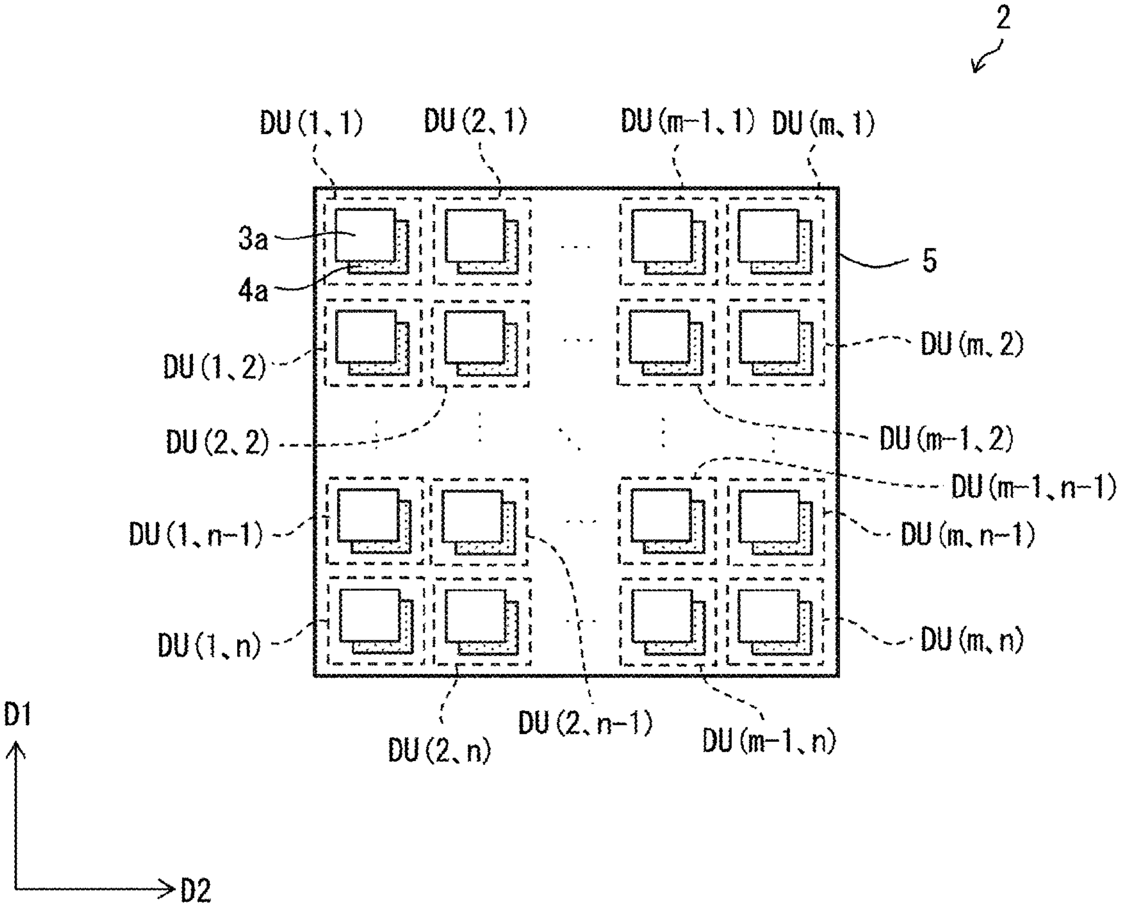
FIG. 8 is a plan view illustrating a schematic configuration of the display panel included in the display device according to the first embodiment.

FIG. 8 is a plan view illustrating a schematic configuration of the display panel 2 included in the display device 1 according to the first embodiment.

As illustrated in FIGS. 1 and 2, the display device 1 includes the display panel 2 and the control device 10.

As illustrated in FIGS. 4 and 8, in the display panel 2, multiple (n×m) display units DU, that is, display units DU(1, 1) to DU(m, n), each of which includes the first light-emitting element 3*a* and the second light-emitting element 4*a*, are arranged along n rows and m columns (m and n are natural numbers of two or more).

Each of the display units DU(1, 1) to DU(m, n) illustrated in FIG. 8 is a subpixel of a respective color, and in the present embodiment, for example, in each of the first row to the nth row of the display units DU(1, 1) to DU(m, n), a group of three adjacent display units in a second direction D2 illustrated in FIG. 8 (e.g., the display unit DU(1, 1), the display unit DU(2, 1), and the display unit DU(3, 1)) is defined as one pixel, but one pixel is not limited to such a group. For example, the display unit DU(1, 1), the display unit DU(2, 1), and the display unit DU(1, 2) adjacent to each other may be defined as one pixel, or a group of four or more adjacent display units may be defined as one pixel.

As illustrated in FIG. 8, in the present embodiment, as described above, a group of three display units adjacent in the second direction D2, for example, the display unit DU(1, 1), the display unit DU(2, 1), and the display unit DU(3, 1) constitute one pixel, so that, for example, the display unit DU(1, 1) can be a red subpixel, the first light-emitting element 3*a* and the second light-emitting element 4*a* included in the display unit DU(1, 1) can be made to emit red light, the display unit DU(2, 1) can be a green subpixel, the first light-emitting element 3*a* and the second light-emitting element 4*a* included in the display unit DU(2, 1) can be made to emit green light, and the display unit DU(3, 1) can be a blue subpixel, and the first light-emitting element 3*a* and the second light-emitting element 4*a* included in the display unit DU(3, 1) can be made to emit blue light.

As illustrated in FIG. 4, the display panel 2 includes a substrate 5, and in the present embodiment, the first light-emitting element 3*a* and the second light-emitting element 4*a* included in each display unit DU of the display panel 2 completely overlap in a plan view, and the first light-emitting element 3*a* is located farther from the substrate 5 than the second light-emitting element 4*a*. That is, as illustrated in FIG. 8, a case will be described as an example in which, in the multiple display units DU(1, 1) to DU(m, n) included in the display panel 2, the second light-emitting element 4*a* and the first light-emitting element 3*a* are layered in this order from a substrate 5 side, with the first light-emitting element 3*a* being located as an upper layer, and the second light-emitting elements 4*a* being located as a lower layer, and when the display panel 2 is viewed from a light-emitting surface side, that is, when the display panel 2 is viewed in a plan view, only the first light-emitting element 3*a* is visible, but this case is just an example. The first light-emitting element 3*a* and the second light-emitting element 4*a* do not need to completely overlap in a plan view, but may overlap partially in a plan view. As will be described later, the first light-emitting element 3*a* and the second light-emitting element 4*a* do not need to overlap in a plan view.

In the present embodiment, a case will be described as an example in which the first light-emitting element 3*a* located above the substrate 5 is disposed farther from the substrate 5 than the second light-emitting element 4*a* located above the substrate 5, but this case is just an example. It is sufficient that one of the first light-emitting element 3*a* and the second light-emitting element 4*a* located above the substrate 5 is disposed farther from the substrate 5 than the other of the first light-emitting element 3*a* and the second light-emitting element 4*a* located above the substrate 5, so that the second light-emitting element 4*a* may be disposed farther from the substrate 5 than the first light-emitting element 3*a*.

In the present embodiment, a case will be described as an example in which each of the first light-emitting element 3*a* and the second light-emitting element 4*a* is a quantum-dot light-emitting diode including light-emitting layer containing quantum dots, but this case is just an example. The first light-emitting element 3*a* may be any one of a quantum dot light-emitting diode including a light-emitting layer containing quantum dots, an organic light-emitting diode including an organic light-emitting layer, and an inorganic light-emitting diode including an inorganic light-emitting layer, and the second light-emitting element 4*a* may be any one of a quantum dot light-emitting diode including a light-emitting layer containing quantum dots, an organic light-emitting diode including an organic light-emitting layer, and an inorganic light-emitting diode including an inorganic light-emitting layer.

As illustrated in FIGS. 1 and 2, the display panel 2 includes the first drive circuit group 3, and the first drive circuit group 3 is a group of n×m first drive circuits 3*b*, each of which includes the first light-emitting element 3*a* illustrated in FIG. 5. The display panel 2 also includes the second drive circuit group 4, and the second drive circuit group 4 is a group of n×m second drive circuits, each of which includes the second light-emitting element 4*a* (not illustrated).

As illustrated in FIGS. 1 and 2, the control device 10 includes a timing control unit (control unit) 11 that causes the display panel 2 to display an image based on input image data, a frame memory (memory) 12 that stores the input image data, and switching elements SW1 to SW3 that are controlled by a drive circuit group selection signal output from the timing control unit 11.

In a period during which the write period to the first drive circuit group 3 (write period) and the light emission period of the first light-emitting element group (light emission period) are alternately repeated, such as a drive timing of the first drive circuit group 3 illustrated above a dotted line in FIG. 3 and a drive timing of the second drive circuit group 4 illustrated below the dotted line in FIG. 3, the timing control unit (control unit) 11 of the control device 10 included in the display device 1 writes data (write data) based on the input image data to the first drive circuit group 3 during the write period to the first drive circuit group 3, causes the first light-emitting element group to emit light during the light emission period of the first light-emitting element group, and causes the second light-emitting element group to emit light during the write period to the first drive circuit group 3. In the present embodiment, a case will be described as an example in which an entire write period to the first drive circuit group 3 is the light emission period of the second light-emitting element group, but this case is just an example. At least part of the write period to the first drive circuit group 3 may be the light emission period of the second light-emitting element group, and the second light-emitting element group may be made to emit light during the light emission period of the second light-emitting element group. As illustrated in FIG. 3, the timing control unit 11 writes data to the second drive circuit group 4 (write data) based on the input image data during the light emission period of the first light-emitting element group.

As illustrated in FIG. 3, a combined period of the write period to the first drive circuit group 3 and the light emission period of the first light-emitting element group is one frame period, and a combined period of the light emission period of the second light-emitting element group, which is set to the same length as the write period to the first drive circuit group 3, and the write period to the second drive circuit group 4, which is set to the same length as the light emission period of the first light-emitting element group, is also one frame period. For example, when a frame frequency for driving the display panel 2 is 120 Hz, the one frame period is 8.3 msec, and when the frame frequency for driving the display panel 2 is 60 Hz, the one frame period is 16.7 msec.

The data written to the first drive circuit group 3 (write data) during the write period to the first drive circuit group 3 and the data written to the second drive circuit group 4 (write data) during the write period to the second drive circuit group 4, which is a period immediately after the write period to the first drive circuit group 3, are the same data. Therefore, the timing control unit 11 illustrated in FIGS. 1 and 2 writes the input image data to the frame memory 12 once and reads the input image data from the frame memory 12 twice during the one frame period.

In the frame memory 12, input image data for one frame is sequentially written, for example, line by line, in response to a write enable signal for each line in the memory, which is a memory control signal from the timing control unit 11. From the frame memory 12, input image data for one frame is sequentially read as a write signal to be supplied to the display panel 2, for example, line by line from the previously written input image data in response to a read enable signal for each line in the memory, which is a memory control signal from the timing control unit 11.

In the present embodiment, the data written to the second drive circuit group 4 (write data) during the write period to the second drive circuit group 4 illustrated in FIG. 3 is sequentially read line by line from the frame memory 12 during the write period to the second drive circuit group 4 illustrated in FIG. 3, as described above. Therefore, after a predetermined period of time has elapsed from the second read timing of each line in the frame memory 12, input image data for the next one frame can be sequentially written to the frame memory 12 line by line. Thus, the input image data for the next one frame can be written to the frame memory 12, for example, during a later half period of the write period to the second drive circuit group 4 illustrated in FIG. 3 and a former half period of the write period to the first drive circuit group 3 immediately after the later half period.

As described above, the period from the start of the current write of each line in the frame memory 12 to the start of the next write is one frame period, and the period from the start of the current read of each line in the frame memory 12 to the start of the next read is one half frame period. Thus, during the one frame period, the timing control unit 11 illustrated in FIGS. 1 and 2 writes the input image data to the frame memory 12 once and reads the input image data from the frame memory 12 twice.

In the present embodiment, as illustrated in FIG. 3, a case will be described as an example in which, during the light emission period of the first light-emitting element group and the light emission period of the second light-emitting element group, a PWM signal is generated using a sweep signal with a gradually increasing voltage to cause each of the first light-emitting element group and the second light-emitting element group to emit light, but this case is just an example. For example, a PWM signal may be generated using a sweep signal with a gradually decreasing voltage to cause each of the first light-emitting element group and the second light-emitting element group to emit light.

As illustrated in FIG. 1, during the write period to the first drive circuit group 3 and the light emission period of the second light-emitting element group illustrated in FIG. 3 based on an input synchronization signal generated according to a predetermined frame frequency for driving the display panel 2, the timing control unit 11 supplies a drive circuit group selection signal to the switching element SW1 for controlling the switching element SW1 to a first connection state F so that write signals sequentially read from each line in the frame memory 12 are supplied to the first drive circuit group 3 via a first data-side drive circuit (not illustrated), supplies a drive circuit group selection signal to the switching element SW2 for controlling the switching element SW2 to the first connection state F so that a gate scanning signal and a T1-G1 signal and a T2-G2 signal both not illustrated in FIG. 1 (see FIG. 6), which are output, are supplied to the first drive circuit group 3 via a first scanning-side drive circuit (not illustrated), and supplies a drive circuit group selection signal to the switching element SW3 for controlling the switching element SW3 to a second connection state S so that the sweep signal generated and output by an internal sweep signal generation circuit is supplied to the second drive circuit group 4. The first data-side drive circuit (not illustrated) operates to write analog voltages corresponding to write signals sequentially read from the respective lines in the frame memory 12 to the first drive circuit group 3. By synchronizing the timing with a gate scanning signal for the first drive circuit group 3, it is possible to sequentially charge capacitors C1 formed in the respective first drive circuits 3*b* of the first drive circuit group 3 with an amount of charge corresponding to a write signal.

On the other hand, as illustrated in FIG. 2, during the write period to the second drive circuit group 4 and the light emission period of the first light-emitting element group illustrated in FIG. 3 based on the input synchronization signal, the timing control unit 11 supplies a drive circuit group selection signal to the switching element SW1 for controlling the switching element SW1 to the second connection state S so that write signals sequentially read from each line in the frame memory 12 are supplied to the second drive circuit group 4 via a second data-side drive circuit (not illustrated), supplies a drive circuit group selection signal to the switching element SW2 for controlling the switching element SW2 to the second connection state S so that the gate scanning signal and the T1-G1 signal and the T2-G2 signal both not illustrated in FIG. 2 (see FIG. 6), which are output, are supplied to the second drive circuit group 4 via a second scanning-side drive circuit (not illustrated), and supplies a drive circuit group selection signal to the switching element SW3 for controlling the switching element SW3 to the first connection state F so that the sweep signal generated and output by the internal sweep signal generation circuit is supplied to the first drive circuit group 3. The second data-side drive circuit (not illustrated) operates to write analog voltages corresponding to write signals sequentially read from the respective lines in the frame memory 12 to the second drive circuit group 4. By synchronizing the timing with a gate scanning signal for the second drive circuit group 4, it is possible to sequentially charge capacitors formed in the respective second drive circuits of the second drive circuit group 4 with an amount of charge corresponding to a write signal.

Figure 6:
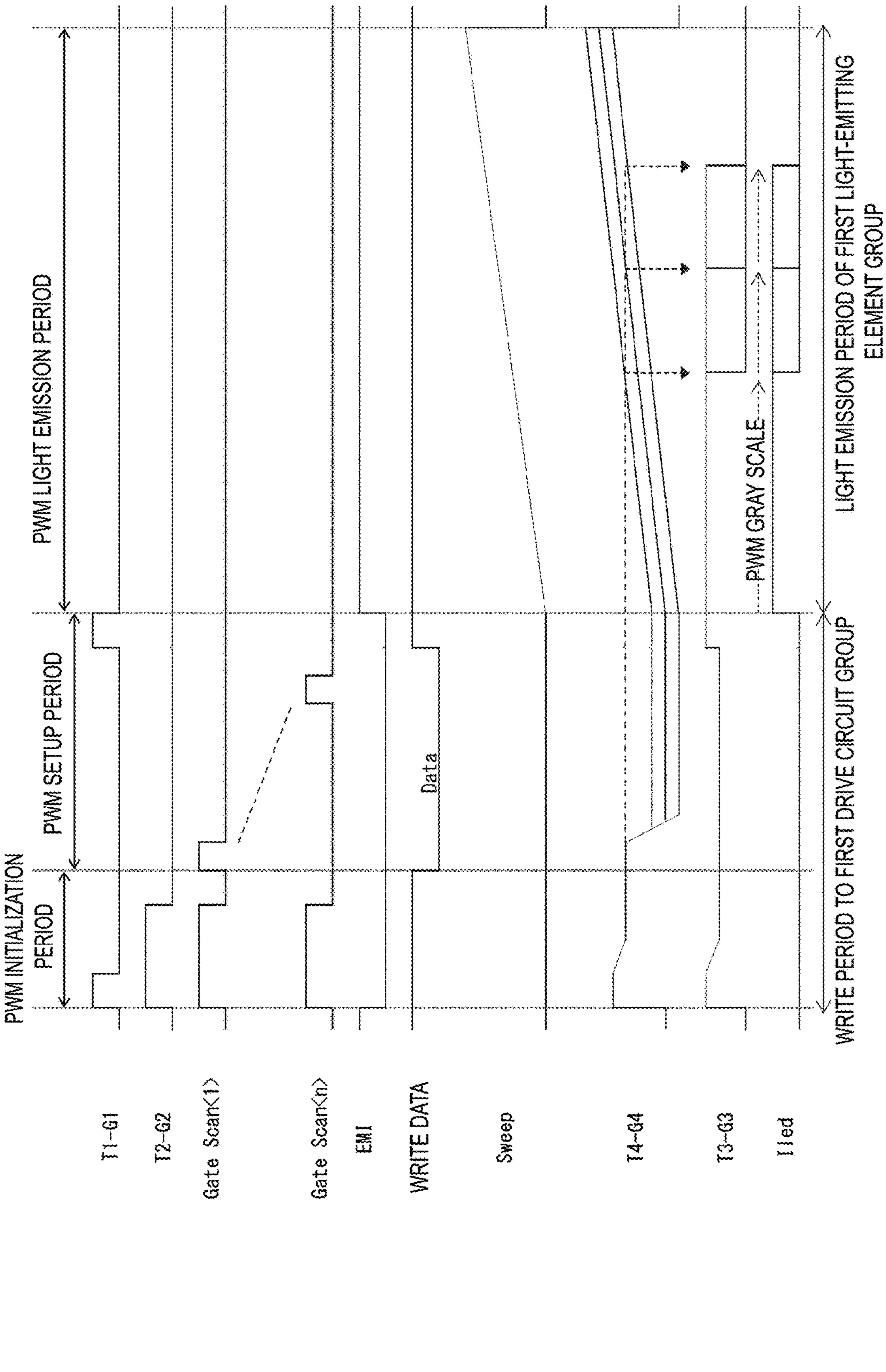
FIG. 6 is a diagram illustrating an example of various signals supplied to the first drive circuit illustrated in FIG. 5 and a current flowing through a first light-emitting element when the first drive circuit illustrated in FIG. 5 is driven based on the various signals.

FIG. 6 is a diagram illustrating an example of various signals supplied to the first drive circuit 3*b* illustrated in FIG. 5 and a current flowing through the first light-emitting element 3*a* when the first drive circuit 3*b* illustrated in FIG. 5 is driven based on the various signals.

Figure 7:
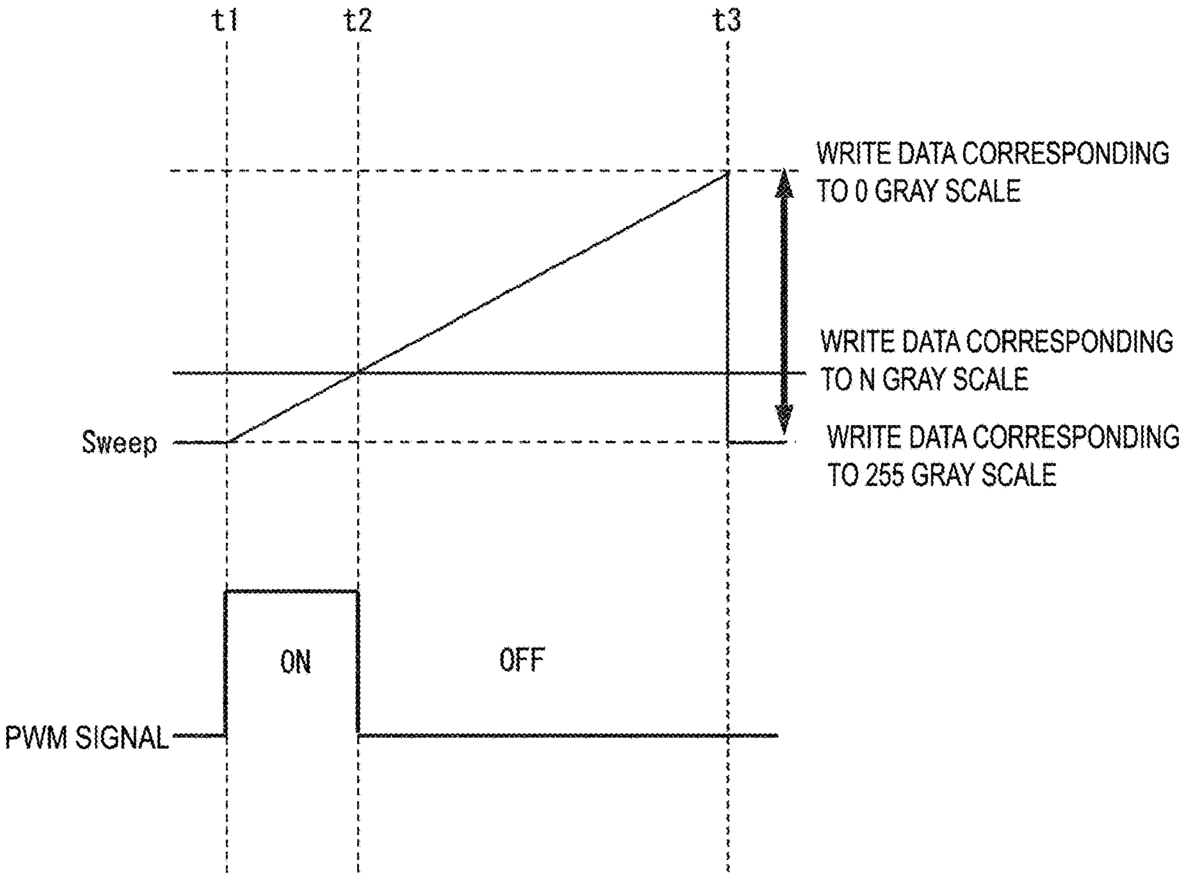
FIG. 7 is a diagram illustrating an example of a case in which a PWM signal is generated based on write data and a sweep signal in the first drive circuit illustrated in FIG. 5.

FIG. 7 is a diagram illustrating an example of a case in which a PWM signal is generated based on the write data and the sweep signal in the first drive circuit 3*b* illustrated in FIG. 5.

The first drive circuit 3*b* illustrated in FIG. 5 includes the first light-emitting element 3*a* included in the display unit DU(m, n) illustrated in FIG. 8, and is electrically connected to a data signal line DLm in a mth column, a scanning signal line GLn in an nth row, and a light emission control line EMIn in the nth row.

The first drive circuit 3*b* illustrated in FIG. 5 includes a transistor T1 controlled by supplying the T1-G1 signal illustrated in FIG. 6 to a gate electrode G1 of the transistor T1, a transistor T2 controlled by supplying the T2-G2 signal illustrated in FIG. 6 to a gate electrode G2 of the transistor T2, a transistor T3 controlled by supplying a T3-G3 signal illustrated in FIG. 6 to a gate electrode G3 of the transistor T3, a transistor T4 controlled by supplying a T4-G4 signal illustrated in FIG. 6 to a gate electrode G4 of the transistor T4, a transistor T5 controlled by supplying a gate scan <n> signal illustrated in FIG. 6 to a gate electrode of the transistor T5 via the scanning signal line GLn in the nth row, and a transistor T6 controlled by supplying an EMI signal illustrated in FIG. 6 to a gate electrode of the transistor T6 via the light emission control line EMIn in the nth row. Note that each of the light emission control lines EMI1 to EMIn in the first to nth rows is supplied with a common EMI signal illustrated in FIG. 6.

The write period to the first drive circuit group 3 illustrated in FIG. 6 is a period during which the EMI signal is low, which turns off the transistor T6. During this period, a high-potential-side power supply voltage ELVDD is not supplied to a source electrode of the transistor T3 via the transistor T6, so that regardless of a potential of the gate electrode G3 of the transistor T3, that is, a potential of a node N1, no current flows through the first light-emitting element 3*a*, resulting in a non-light emission state. On the other hand, the light emission period of the first light-emitting element 3*a* illustrated in FIG. 6 is a period during which the EMI signal is high, which turns on the transistor T6. During this period, the high-potential-side power supply voltage ELVDD is supplied to the source electrode of the transistor T3 via the transistor T6, so that while the potential of the gate electrode G3 of the transistor T3, that is, the potential of the node N1, is equal to or higher than a threshold, a constant current flows through the first light-emitting element 3*a*, resulting in a light emission state.

The write period to the first drive circuit group 3 illustrated in FIG. 6 is composed of a PWM initialization period and a PWM setup period, and the light emission period of the first light-emitting element group 3*a* illustrated in FIG. 6 is composed of a PWM light emission period.

In the PWM initialization period illustrated in FIG. 6, initialization can be performed by turning on the transistor T1, the transistor T2, and the transistor T5 of each of the m×n first drive circuits 3*b*, which are the first drive circuit group 3 included in the display panel 2, and writing predetermined write data to the node N1, a node N2, a node N3, and the capacitor C1.

As illustrated in FIG. 6, in the PWM setup period after the PWM initialization period, during a period in which the transistor T5 is on, that is, during a period in which the gate scanning signals gate scan <1> to gate scan <n> sequentially becomes high, predetermined write data is written row by row to the m×n first drive circuits 3*b*. During the PWM setup period, the transistor T2 maintains an off state, so that the gate electrode G4 of the transistor T4, that is, the node N3, maintains a constant voltage corresponding to the write data as indicated by the T4-G4 signal illustrated in FIG. 6. During the PWM setup period, the transistor T2 maintains the off state, so that the gate electrode G3 of the transistor T3, that is, the node N1, maintains a constant voltage after the initialization described above as indicated by the T3-G3 signal in FIG. 6. However, during a last part of the PWM setup period, the transistor T1 is turned on, and the predetermined write data used during the initialization described above is supplied to the gate electrode G3 of the transistor T3, that is, the node N1, and the constant voltage after the initialization described above rises slightly during this period, as indicated by the T3-G3 signal illustrated in FIG. 6. Note that as illustrated in FIG. 5, the sweep signal supplied via a sweep signal line connected to one electrode of a capacitor C2 of the first drive circuit 3*b* is supplied as a constant voltage of, for example, 0 V during the PWM initialization period and the PWM setup period, which are the write period to the first drive circuit group 3.

During the light emission period of the first light-emitting element group illustrated in FIG. 6, that is, during the PWM light emission period, a sweep signal with a gradually increasing voltage is supplied, and the voltage of the gate electrode G4 of the transistor T4, that is, the node N3, gradually increases due to an influence of the above mentioned sweep signal, as indicated by the T4-G4 signal illustrated in FIG. 6. Until the voltage of the gate electrode G4 of the transistor T4 reaches a threshold voltage Vth of the transistor T4, the voltage of the gate electrode G3 of the transistor T3, that is, the voltage of the node N1, also rises, the transistor T3 maintains the on state, and a predetermined current Iled flows through the first light-emitting element 3*a*, resulting in the light emission state. On the other hand, when the voltage of the gate electrode G4 of the transistor T4 exceeds the threshold voltage Vth of the transistor T4, the transistor T4 is turned off. Accordingly, the transistor T3 is also turned off, resulting in a non-light emission state in which the current Iled does not flow through the first light-emitting element 3*a*.

As indicated by the T4-G4 signal illustrated in FIG. 6, the higher the voltage of the write data is, the sooner the time required for the voltage of the gate electrode G4 of the transistor T4 to reach the threshold voltage Vth of the transistor T4 becomes, so the PWM gray scale becomes smaller and the light emission period of the first light-emitting element 3*a* becomes shorter. As described above, it is possible to achieve PWM drive that can control the emission period of the first light-emitting element 3*a* according to the voltage of the write data, that is, the gray scale value of the input image data.

In the present embodiment, as illustrated in FIG. 7, the voltage of the write data corresponding to the gray scale value of the input image data being 0 gray scale is set higher than the voltage of the write data corresponding to the gray scale value of the input image data being 255 gray scale, and an on period of the PWM signal generated based on the write data corresponding to 255 gray scale is longer than the on period of the PWM signal generated based on the write data corresponding to 0 gray scale. Note that the PWM signal illustrated in FIG. 7 indicates a PWM signal generated based on the write data corresponding to N gray scales, which are gray levels indicated by a solid line in FIG. 7.

Note that although the second drive circuit including the second light-emitting element 4*a* is not separately illustrated here, the second drive circuit may have a similar configuration to the first drive circuit 3*b* including the first light-emitting elements 3*a*, illustrated in FIG. 5, except that a resistor R1 illustrated in FIG. 5 is excluded, and only the drive timing is different as illustrated in FIG. 3.

In the display device 1 according to the present embodiment, luminance correction may be performed on at least one of the first light-emitting element 3*a* and the second light-emitting element 4*a* included in each of the display units DU(1, 1) to DU(m, n) illustrated in FIG. 8 according to a distance from the substrate 5.

As illustrated in FIG. 4, in the display panel 2 included in the display device 1 according to the present embodiment, the first light-emitting element 3*a* is located farther from the substrate 5 than the second light-emitting element 4*a*, and when the display panel 2 is viewed from the light emitting surface side, the luminance of the first light-emitting element 3*a* corresponding to a certain gray scale value may be brighter than the luminance of the second light-emitting element 4*a* corresponding to the certain gray scale value.

Therefore, in the present embodiment, as illustrated in FIG. 5, in the first drive circuit 3*b* including the first light-emitting element 3*a*, the resistor R1 is included to relatively reduce the amount of current flowing through the first light-emitting element 3*a*, and in the second drive circuit including the second light-emitting element 4*a* (not illustrated), a resistor R2 smaller than the resistor R1 is included or the resistor R2 is not included to relatively increase the amount of current flowing through the second light-emitting element 4*a*, thereby correcting the luminances of the first light-emitting element 3*a* and the second light-emitting element 4*a* according to the distance from the substrate 5. By performing such luminance correction, the luminance of the first light-emitting element 3*a* and the luminance of the second light-emitting element 4*a* corresponding to the same gray scale value can be made equal. The luminance correction is not limited to this manner, and any methods may be used as long as it can make the amount of current flowing through the second light-emitting element 4*a* larger than the amount of current flowing through the first light-emitting element 3*a* for the same write data. For example, the luminance correction may be performed by setting the high-potential-side power supply voltage ELVDD used in the second drive circuit including the second light-emitting element 4*a* to be higher than the high-potential-side power supply voltage ELVDD used in the first drive circuit 3*b* illustrated in FIG. 5, by setting the PWM drive voltage used in the second drive circuit including the second light-emitting element 4*a* to be higher than the PWM drive voltage used in the first drive circuit 3*b*, or by setting the on period of the PWM signal generated in the second drive circuit including the second light-emitting element 4*a* to be longer than the on period of the PWM signal generated in the first drive circuit 3*b*.

As described above, according to the control device 10 and the display device 1 including the display panel 2 and the control device 10, it is possible to eliminate the period during which light is not emitted simultaneously over the entire surface due to the write period within one frame period without increasing the frame frequency for driving the display panel 2, thereby suppressing flicker.

Figure 9:
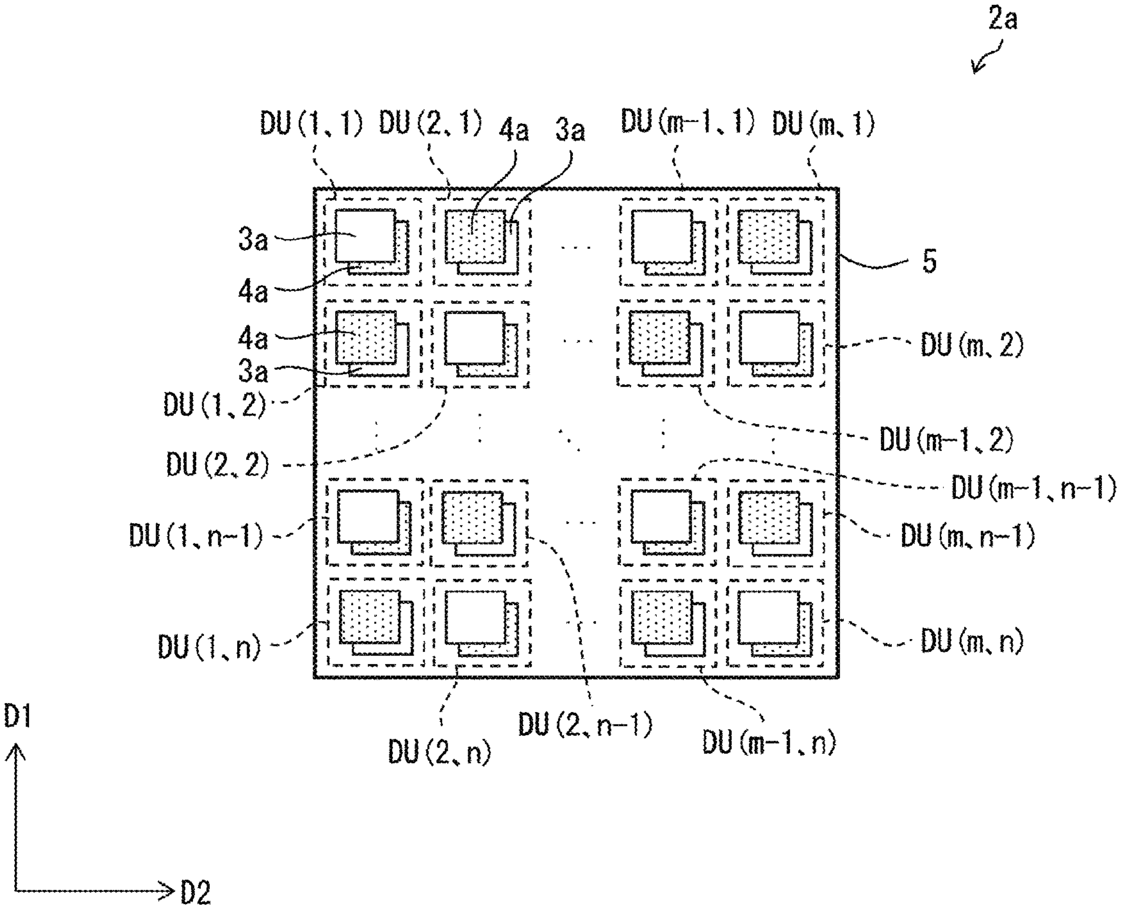
FIG. 9 is a plan view illustrating a schematic configuration of another display panel that can be included in the display device according to the first embodiment.

FIG. 9 is a plan view illustrating a schematic configuration of another display panel 2*a* that can be included in the display device 1 according to the first embodiment.

As illustrated in FIG. 9, the display panel 2*a* includes multiple display units DU(1, 1) to DU(m, n) including first display units and second display units. In the first display units (e.g., the display unit DU(1, 1) and the display unit DU(2, 2)), the first light-emitting element 3*a* is located farther from the substrate 5 than the second light-emitting element 4*a*, and in the second display units (e.g., the display unit DU(2, 1) and the display unit DU(1, 2)), the second light-emitting element 4*a* is located farther from the substrate 5 than the first light-emitting element 3*a*, and the first display units and the second display units are alternately arranged in both a first direction D1, which is a vertical direction of the substrate 5, and the second direction D2, which is a horizontal direction of the substrate 5.

According to the display device 1 including the display panel 2*a*, the first display units and the second display units described above are arranged in a houndstooth pattern, so that flicker can be suppressed effectively.

In the display device 1 including the above-described display panel 2 or 2*a* and the control device 10, the first drive circuit 3*b* including the first light-emitting element 3*a* and the second drive circuit including the second light-emitting element 4*a* are separately driven, so that the signal lines for the first drive circuit 3*b* and the signal lines for the second drive circuit can be separately and independently arranged. For example, the signal lines, a drive IC, and the like for the first drive circuit 3*b* may be located on the front surface side of the substrate 5, and the signal lines, a drive IC, and the like for the second drive circuit may be located on the back surface side of the substrate 5.

Figure 10:
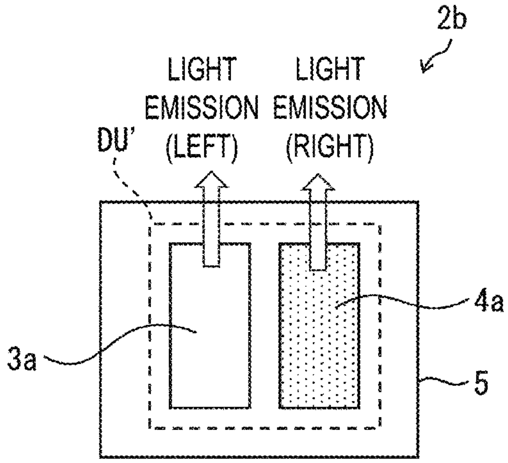
FIG. 10 is a diagram illustrating a schematic configuration of a display unit of still another display panel that can be included in the display device according to the first embodiment.

FIG. 10 is a diagram illustrating a schematic configuration of a display unit DU' of still another display panel 2*b* that can be included in the display device 1 according to the first embodiment.

Figure 11:
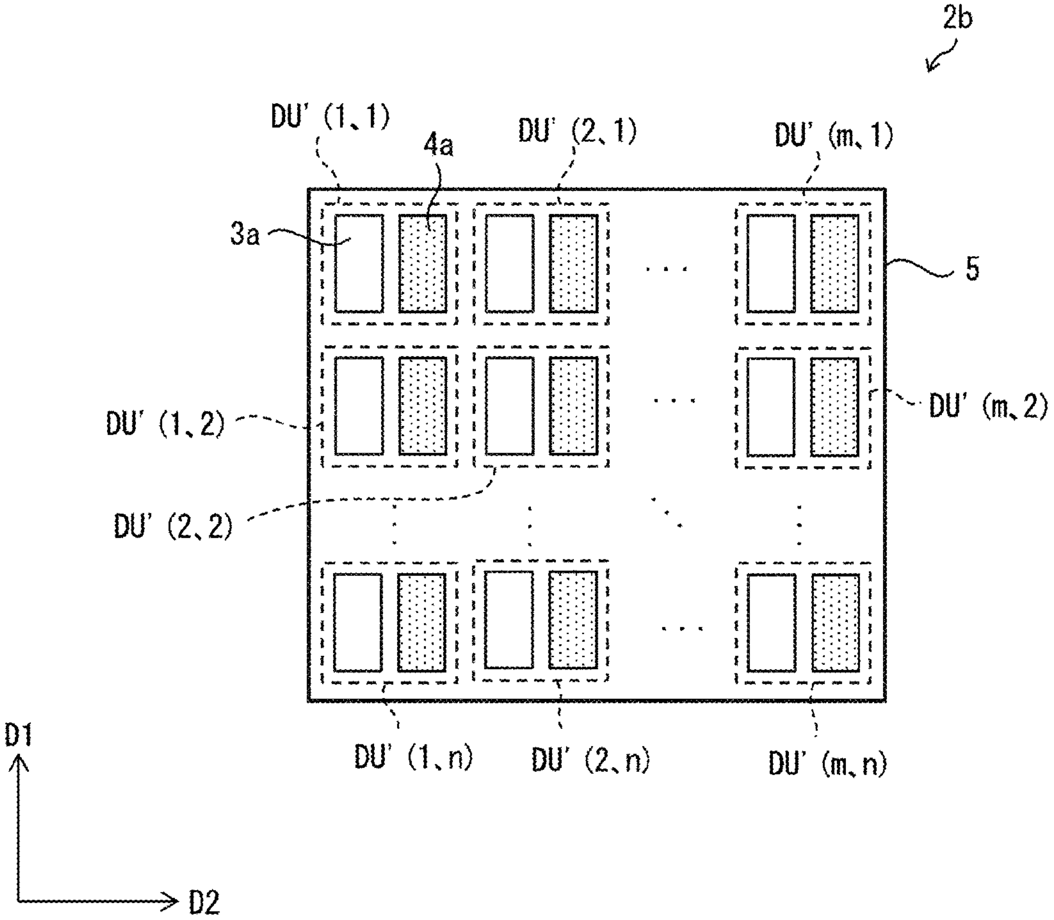
FIG. 11 is a plan view illustrating a schematic configuration of the display panel including multiple display units, one of which is illustrated in FIG. 10.

FIG. 11 is a plan view illustrating a schematic configuration of the display panel 2*b* including multiple display units DU', one of which is illustrated in FIG. 10.

Figure 12:
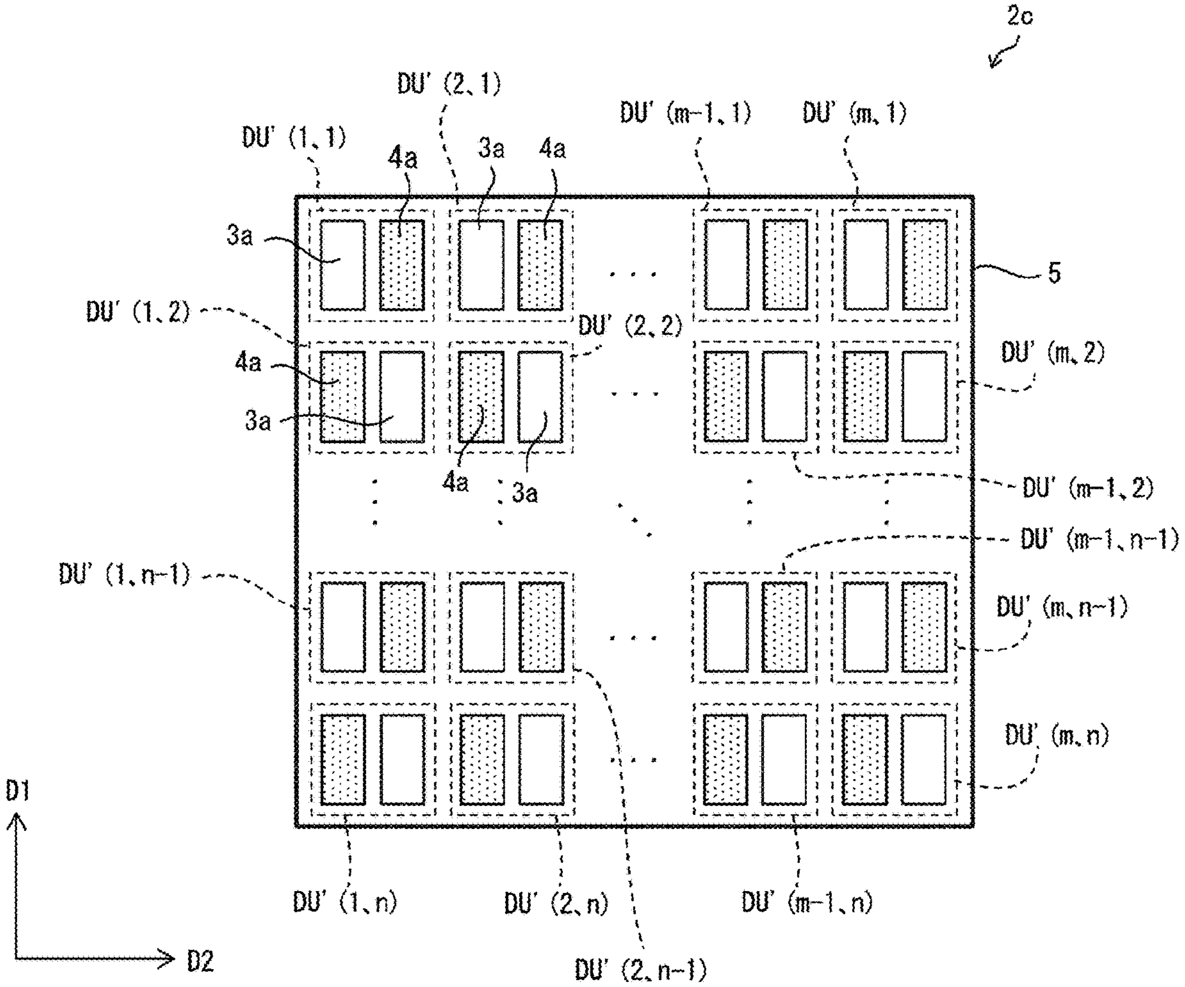
FIG. 12 is a plan view illustrating a schematic configuration of still another display panel that can be included in the display device according to the first embodiment.

FIG. 12 is a plan view illustrating a schematic configuration of still another display panel 2*c* that can be included in the display device 1 according to the first embodiment.

As illustrated in FIGS. 10 and 11, in each of the multiple display units DU'(1, 1) to DU'(m, n) of the display panel 2*b*, the first light-emitting element 3*a* and the second light-emitting element 4*a* do not overlap in a plan view.

According to the display device 1 including the display panel 2*b*, the first light-emitting element 3*a* and the second light-emitting element 4*a* can be arranged at the same distance from the substrate 5, so that it is not necessary to perform luminance correction performed for at least one of the first light-emitting element 3*a* and the second light-emitting element 4*a* in accordance with the distance from the substrate 5 or the difference in transmittance of light emitted from each of the light-emitting elements when the first light-emitting element and the second light-emitting element overlap in a plan view.

As illustrated in FIG. 12, in the display panel 2*c*, the first light-emitting elements 3*a* and the second light-emitting elements 4*a* are alternately arranged in both the first direction D1, which is the vertical direction of the substrate 5, and the second direction D2, which is the horizontal direction of the substrate 5, and each of the multiple display units DU'(1, 1) to DU'(m, n) includes the first light-emitting element 3*a* and the second light-emitting element 4*a*, which are adjacent to each other in the second direction D2.

According to the display device 1 including the display panel 2*c*, the first light-emitting elements 3*a* and the second light-emitting elements 4*a* are arranged in a houndstooth pattern, so that flicker can be suppressed effectively.

Figure 13:
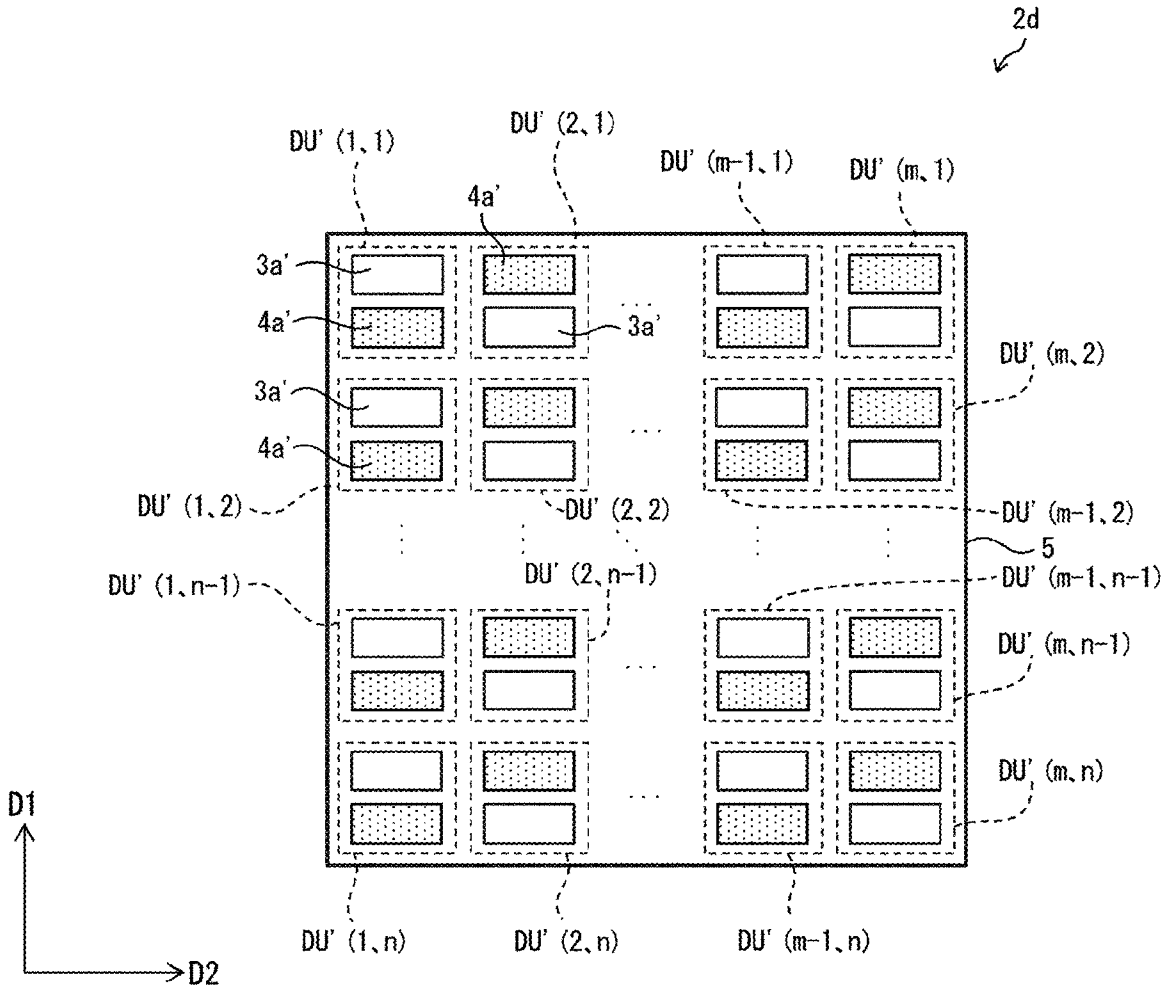
FIG. 13 is a plan view illustrating a schematic configuration of still more another display panel that can be included in the display device according to the first embodiment.

FIG. 13 is a plan view illustrating a schematic configuration of still more another display panel 2*d* that can be included in the display device 1 according to the first embodiment.

As illustrated in FIG. 13, in the display panel 2*d*, first light-emitting elements 3*a*' and second light-emitting elements 4*a*' are alternately arranged in both the first direction D1, which is the vertical direction of the substrate 5, and the second direction D2, which is the horizontal direction of the substrate 5, and each of the multiple display units DU'(1, 1) to DU'(m, n) includes the first light-emitting element 3*a*' and the second light-emitting element 4*a*' adjacent to each other in the first direction D1. Note that the first light-emitting element 3*a*' and the second light-emitting element 4*a*' illustrated in FIG. 13 are each located such that a longitudinal direction of the light-emitting element is along the second direction D2 of the substrate 5, and are therefore different from the first light-emitting element 3*a* and the second light-emitting element 4*a* that are located such that a longitudinal direction of the light-emitting element is along the first direction D1 of the substrate 5.

According to the display device 1 including the display panel 2*d*, the first light-emitting elements 3*a*' and the second light-emitting elements 4*a*' are arranged in a houndstooth pattern, so that flicker can be suppressed effectively.

Second Embodiment

Next, a second embodiment of the disclosure will be described with reference to FIGS. 14 to 16. The present embodiment is different from the first embodiment described above in that, in a display panel 2*e* included in a display device according to the present embodiment, one display unit DU is one pixel that emits multiple colors (first color, second color, and third color), a first light-emitting element 3*ba*1 that emits light in a third color and a second light-emitting element 4*ra* that emits light in a first color different from the third color at least partially overlap in a plan view, a first light-emitting element 3*ba*2 that emits light in the third color and a second light-emitting element 4*ga* that emits light in a second color different from the third color and the first color at least partially overlap in a plan view, and all of these light-emitting elements are included in one display unit DU. The other details are as described in the first embodiment. For convenience of description, members having the same functions as those shown in the drawings according to the first embodiment are denoted by the same reference numerals and signs, and descriptions thereof will be omitted.

Figure 14:
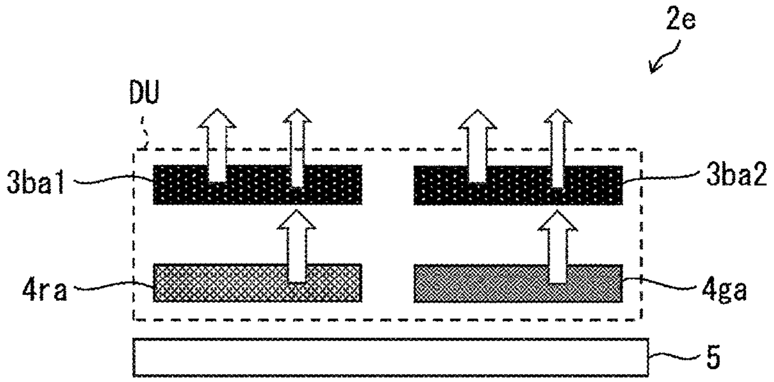
FIG. 14 is a diagram illustrating a schematic configuration of a display unit of a display panel included in a display device according to a second embodiment.

FIG. 14 is a diagram illustrating a schematic configuration of the display unit DU of the display panel 2*e* included in the display device according to the second embodiment.

As illustrated in FIG. 14, the display unit DU of the display panel 2*e* is one pixel that emits multiple colors. The first light-emitting elements 3*ba*1 and 3*ba*2 emit the first color, and the second light-emitting elements 4*ra* and 4*ga* emit the colors different from the first color.

The display device according to the second embodiment includes the display panel 2*e* illustrated in FIG. 14 and a control device. As illustrated in FIG. 14, in the display panel 2*e*, a case will be described as an example in which the first light-emitting elements 3*ba*1 and 3*ba*2 and the second light-emitting elements 4*ra* and 4*ga* completely overlap in a plan view, respectively, but this case is just an example, and it is sufficient that the first light-emitting element and the second light-emitting element at least partially overlap in a plan view. In the display panel 2*e*, a case will be described as an example in which the first light-emitting elements 3*ba*1 and 3*ba*2 are located farther from a substrate 5 than the second light-emitting elements 4*ra* and 4*ga*, but this case is just an example, and it is sufficient that one of a set of the first light-emitting elements 3*ba*1 and 3*ba*2 and a set of the second light-emitting elements 4*ra* and 4*ga* are located farther from the substrate 5 than the other of the set of the first light-emitting elements 3*ba*1 and 3*ba*2 and the set of the second light-emitting elements 4*ra* and 4*ga*. A case will be described as an example in which each of the multiple display units DU of the display panel 2*e* includes the multiple first light-emitting elements 3*ba*1 and 3*ba*2 and the multiple second light-emitting elements 4*ra* and 4*ga*, and the first light-emitting elements 3*ba*1 and 3*ba*2 emit blue light, the second light-emitting element 4*ga* emits green light, and the second light-emitting element 4*ra* emits red light, but this case is just an example. For example, the multiple first light-emitting elements located farther from the substrate 5 than the multiple second light-emitting elements may emit red light, some of the multiple second light-emitting elements may emit blue light, and the remainder of the multiple second light-emitting elements may emit green light, or the multiple first light-emitting elements located farther from the substrate 5 than the multiple second light-emitting elements may emit green light, some of the multiple second light-emitting elements may emit blue light, and the remainder of the multiple second light-emitting elements may emit red light.

Figure 15:
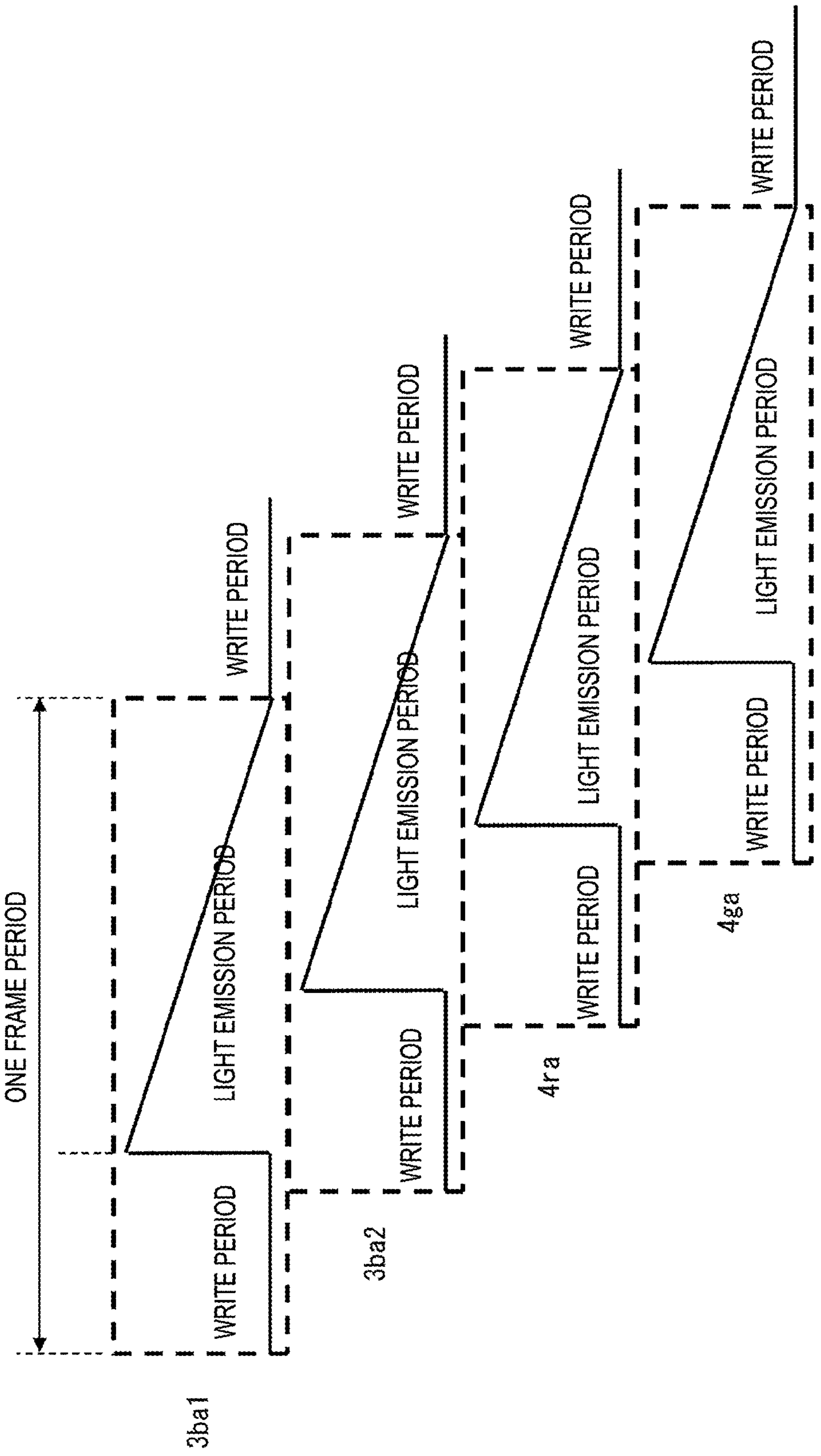
FIG. 15 is a diagram illustrating an example of drive timing for driving the display panel including the display unit illustrated in FIG. 14, and an example of a sweep signal to be used.

FIG. 15 is a diagram illustrating an example of a drive timing for driving the display panel 2*e* including the display unit DU illustrated in FIG. 14 and an example of a sweep signal to be used.

Figure 16:
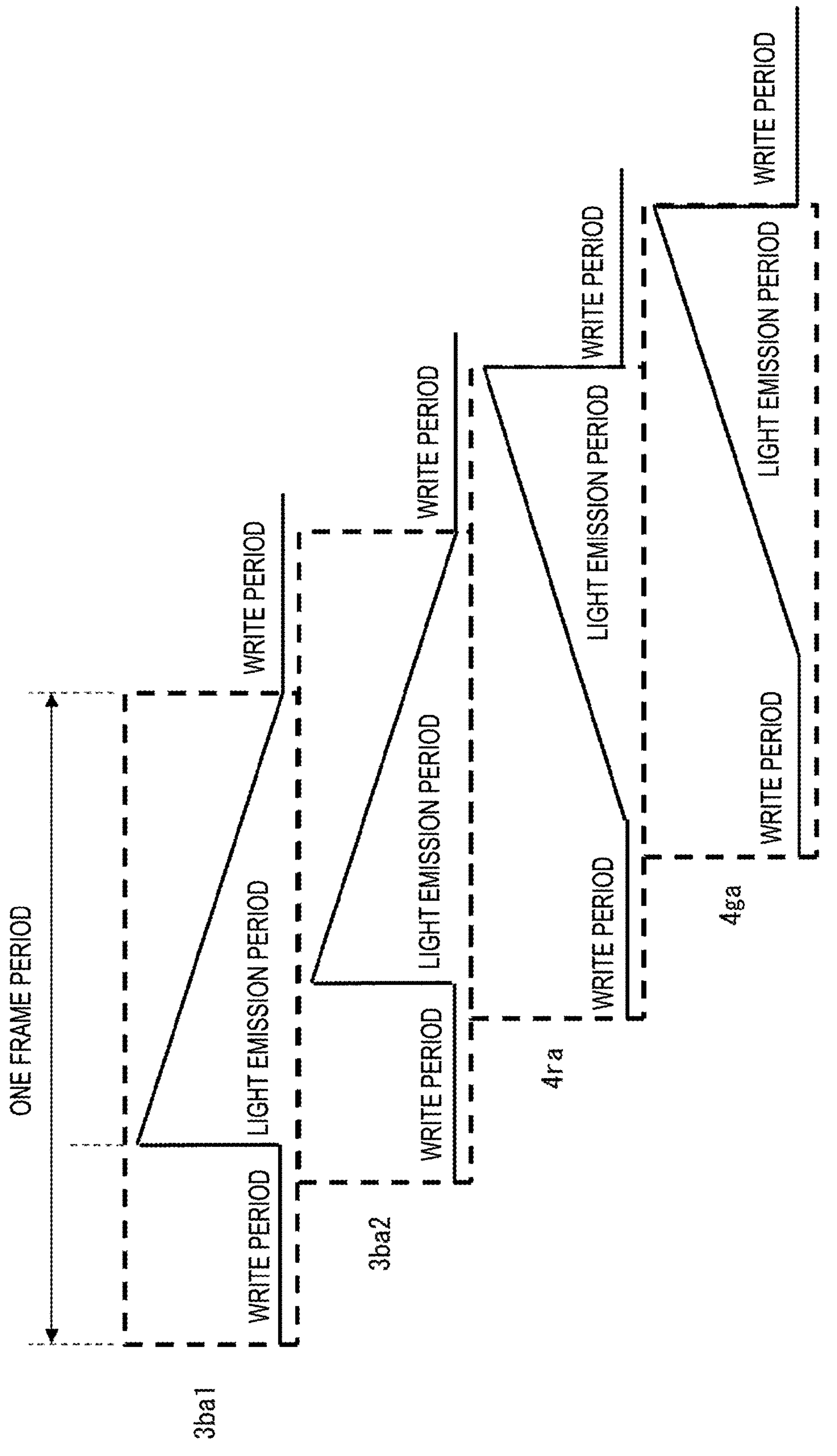
FIG. 16 is a diagram illustrating an example of drive timing for driving the display panel including the display unit illustrated in FIG. 14, and another example of a sweep signal to be used.

FIG. 16 is a diagram illustrating an example of the drive timing for driving the display panel 2*e* including the display unit DU illustrated in FIG. 14 and another example of a sweep signal to be used.

As illustrated in FIG. 15, the first light-emitting element 3*ba*1, the first light-emitting element 3*ba*2, the second light-emitting element 4*ra*, and the second light-emitting element 4*ga* are PWM driven to control luminance by keeping the amount of current flowing through the light-emitting elements constant and changing the current flow time.

As illustrated in FIG. 15, a write period to the first drive circuit including the first light-emitting element 3*ba*1 (write period) and a write period to the second drive circuit including the second light-emitting element 4*ga* partially overlap, and a period during which the multiple first light-emitting elements 3*ba*1 are caused to emit light (light emission period) and a period during which the multiple second light-emitting elements 4*ga* are caused to emit light partially overlap. A write period to the first drive circuit including the first light-emitting element 3*ba*2 (write period) and a write period to the second drive circuit including the second light-emitting element 4*ra* partially overlap, and a period during which the multiple first light-emitting elements 3*ba*2 are caused to emit light (light emission period) and a period during which the multiple second light-emitting elements 4*ra* are caused to emit light partially overlap.

The drive timing for driving the display panel 2*e* is not limited as long as the second light-emitting elements 4*ra* and 4*ga* can be caused to emit light during at least parts of the write periods to the first drive circuits including the first light-emitting elements 3*ba*1 and 3*ba*2 (write period), respectively. For example, as in the drive timing illustrated in FIG. 15, each of the write periods may be shifted in sequence by a quarter frame (e.g., 2.075 msec), which is a quarter of one frame period (e.g., 8.3 msec). Note that in the present embodiment, as illustrated in FIG. 15, a case will be described as an example in which a sweep signal with a gradually increasing voltage is used as the sweep signal, but this case is just an example. For example, as illustrated in FIG. 16, in the first drive circuits including the first light-emitting elements 3*ba*1 and 3*ba*2, a sweep signal with a gradually decreasing voltage may be used as the sweep signal, and in the second drive circuits including the second light-emitting elements 4*ra* and 4*ga*, a sweep signal with a gradually increasing voltage may be used as the sweep signal.

Third Embodiment

Next, a third embodiment of the disclosure will be described with reference to FIGS. 17 and 18. In a display panel 2*f* included in a display device according to the present embodiment, one display unit DU' is one pixel that emits multiple colors (first color, second color, and third color), and the present embodiment is different from the second embodiment described above in that a first light-emitting element 3*ra* that emits light in the first color, a second light-emitting element 4*ra* that emits light in the first color, a first light-emitting element 3*ga* that emits light in the second color different from the first color, a second light-emitting element 4*ga* that emits light in the second color, a first light-emitting element 3*ba* that emits light in the third color different from the first color and the second color, and a second light-emitting element 4*ba* that emits light in the third color, which are included in one display unit DU', do not overlap in a plan view. The others are as described in the second embodiment. For convenience of description, members having the same functions as those illustrated in the drawings of the second embodiment are denoted by the same reference numerals and signs, and descriptions thereof will be omitted.

Figure 17:
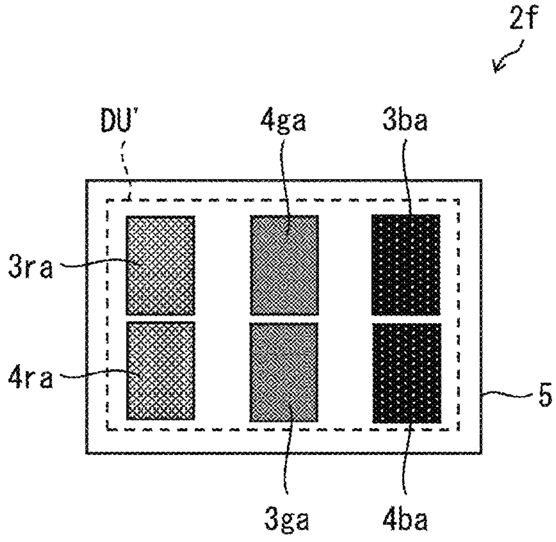
FIG. 17 is a diagram illustrating a schematic configuration of a display unit of a display panel included in a display device according to a third embodiment.

FIG. 17 is a diagram illustrating a schematic configuration of the display unit DU' of the display panel 2*f* included in the display device according to the third embodiment.

As illustrated in FIG. 17, the multiple first light-emitting elements 3*ra*, 3*ga*, and 3*ba* and the multiple second light-emitting elements 4*ra*, 4*ga*, and 4*ba* included in the display unit DU' of the display panel 2*f* do not overlap in a plan view, and the multiple first light-emitting elements 3*ra*, 3*ga*, and 3*ba* and the multiple second light-emitting elements 4*ra*, 4*ga*, and 4*ba* are arranged alternately in both a first direction, which is a vertical direction of a substrate 5, and a second direction, which is a horizontal direction of the substrate 5. The multiple light-emitting elements out of the multiple first light-emitting elements 3*ra*, 3*ga*, and 3*ba* and the multiple second light-emitting elements 4*ra*, 4*ga*, and 4*ba* included in each of the multiple display units DU' are a first red light-emitting element, a first green light-emitting element, and a first blue light-emitting element, and the other multiple light-emitting elements out of the multiple first light-emitting elements 3*ra*, 3*ga*, and 3*ba* and the multiple second light-emitting elements 4*ra*, 4*ga*, and 4*ba* included in each of the multiple display units DU' are a second red light-emitting element, a second green light-emitting element, and a second blue light-emitting element.

Figure 18:
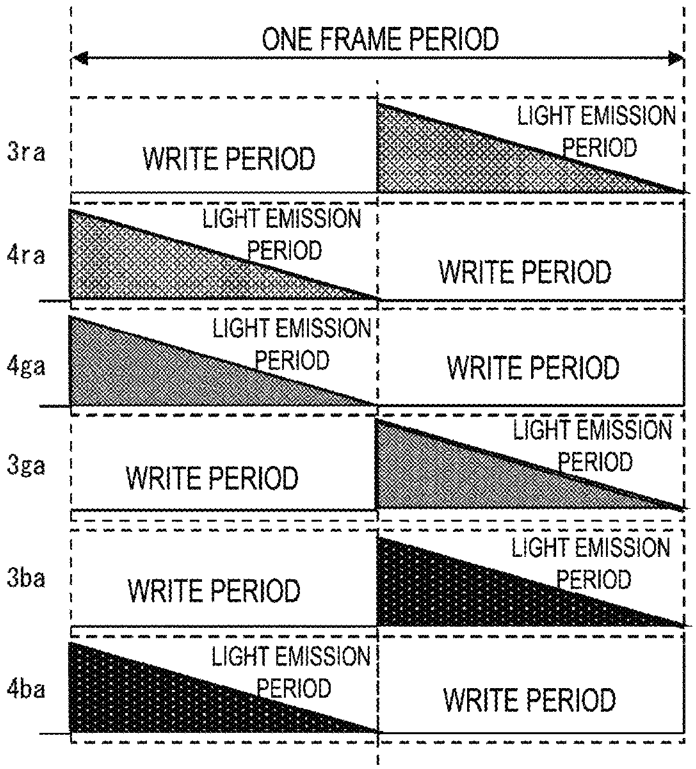
FIG. 18 is a diagram illustrating an example of drive timing for driving the display panel including the display unit illustrated in FIG. 17, and an example of a sweep signal to be used.

FIG. 18 is a diagram illustrating an example of a drive timing for driving the display panel 2*f* including the display unit DU' illustrated in FIG. 17 and an example of a sweep signal to be used.

As illustrated in FIG. 18, in the display device according to the third embodiment, write periods to first drive circuits including the first light-emitting elements 3*ra*, 3*ga*, and 3*ba* are set to light emission periods of the multiple second light-emitting elements 4*ra*, 4*ga*, and 4*ba*, and write periods to the first drive circuits including the second light-emitting elements 4*ra*, 4*ga*, and 4*ba* are set to light emission periods of the multiple first light-emitting elements 3*ra*, 3*ga*, and 3*ba*.

In the present embodiment, a case has been described as an example in which the light-emitting elements out of the multiple first light-emitting elements 3*ra*, 3*ga*, and 3*ba* and the multiple second light-emitting elements 4*ra*, 4*ga*, and 4*ba* included in each of the multiple display units DU' are the first red light-emitting element, the first green light-emitting element, and the first blue light-emitting element, and the other light-emitting elements out of the multiple first light-emitting elements 3*ra*, 3*ga*, and 3*ba* and the multiple second light-emitting elements 4*ra*, 4*ga*, and 4*ba* included in each of the multiple display units DU' are the second red light-emitting element, the second green light-emitting element, and the second blue light-emitting element, but this case is just an example. For example, light-emitting elements out of the multiple first light-emitting elements and the multiple second light-emitting elements included in each of the multiple display units DU' may be green light-emitting elements, some of the other light-emitting elements out of the multiple first light-emitting elements and the multiple second light-emitting elements included in each of the multiple display units DU' may be red light-emitting elements, and the remainder of the other light-emitting elements out of the multiple first light-emitting elements and the multiple second light-emitting elements included in each of the multiple display units DU' may be a blue light-emitting element.

According to the display device according to the third embodiment described above, it is possible to eliminate the period during which light is not emitted simultaneously over the entire surface due to the write period within one frame period without increasing the frame frequency for driving the display panel 2*f*, thereby suppressing flicker.

Fourth Embodiment

Next, a fourth embodiment of the disclosure will be described with reference to FIGS. 19 to 30. The present embodiment is different from the first to third embodiments in that, in display panels 2*g* and 2*h* included in a display device, first light-emitting elements 3*ra*, 3*ga*, and 3*ba* included in display units RDU, GDU, BDU, RDU', GDU', and BDU' are PWM driven, and second light-emitting elements 4*ra*, 4*ga*, and 4*ba* included in the display units RDU, GDU, BDU, RDU', GDU', and BDU' are current driven to control luminance by changing an amount of current flowing through the light-emitting element. The others are as described in the first to third embodiments. For convenience of description, members having the same functions as those of the members illustrated in the drawings in the first to third embodiments are denoted by the same reference numerals and signs, and descriptions thereof will be omitted.

Figure 19:
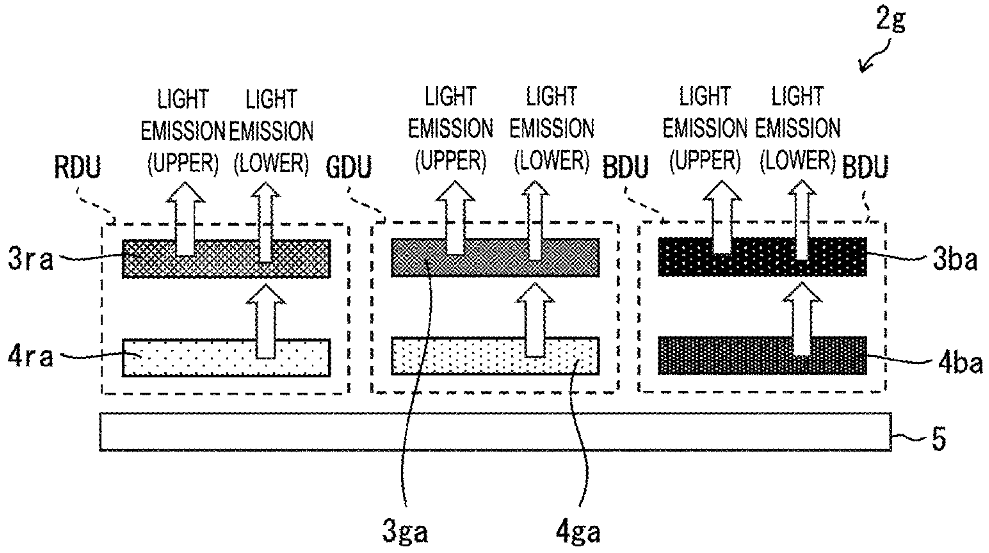
FIG. 19 is a diagram illustrating a schematic configuration of a display panel included in a display device according to a fourth embodiment.

FIG. 19 is a diagram illustrating a schematic configuration of the display panel 2*g* included in the display device according to the fourth embodiment.

As illustrated in FIG. 19, the display unit RDU included in the display panel 2*g* is a red subpixel, the display unit GDU included in the display panel 2*g* is a green subpixel, and the display unit BDU included in the display panel 2*g* is a blue subpixel. In the present embodiment, a case will be described as an example in which the first light-emitting element 3*ra* that emits red light and the second light-emitting element 4*ra* that emits red light included in the display unit RDU completely overlap in a plan view, but this case is just an example, and the first light-emitting element 3*ra* and the second light-emitting element 4*ra* may at least partially overlap in a plan view, and a case will be described as an example in which the first light-emitting element 3*ga* that emits green light and the second light-emitting element 4*ga* that emits green light included in the display unit GDU completely overlap in a plan view, but this case is just an example, and the first light-emitting element 3*ga* and the second light-emitting element 4*ga* may at least partially overlap in a plan view, and a case will be described as an example in which the first light-emitting element 3*ba* that emits blue light and the second light-emitting element 4*ba* that emits blue light included in the display unit BDU completely overlap in a plan view, but this case is just an example, and the first light-emitting element 3*ba* and the second light-emitting element 4*ba* may at least partially overlap in a plan view.

Figure 20:
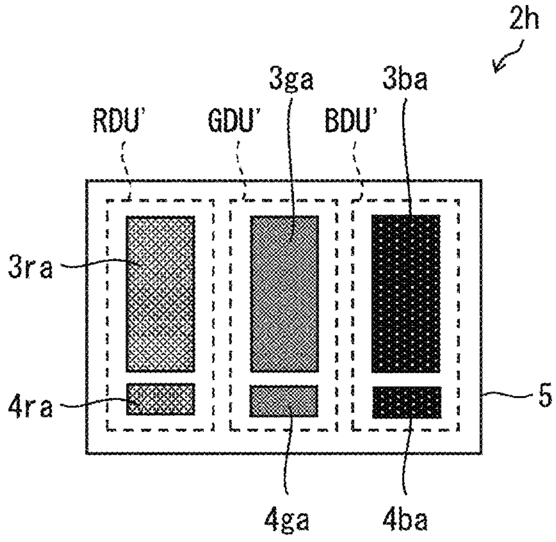
FIG. 20 is a plan view illustrating a schematic configuration of another display panel that can be included in the display device according to the fourth embodiment.

FIG. 20 is a plan view illustrating a schematic configuration of the other display panel 2*h* that can be included in the display device according to the fourth embodiment.

As illustrated in FIG. 20, the display unit RDU' included in the display panel 2*h* is a red subpixel, the display unit GDU' included in the display panel 2*h* is a green subpixel, and the display unit BDU' included in the display panel 2*h* is a blue subpixel. The first light-emitting element 3*ra* that emits red light and the second light-emitting element 4*ra* that emits red light included in the display unit RDU' do not overlap in a plan view, the first light-emitting element 3*ga* that emits green light and the second light-emitting element 4*ga* that emits green light included in the display unit GDU' do not overlap in a plan view, and the first light-emitting element 3*ba* that emits blue light and the second light-emitting element 4*ba* that emits blue light included in the display unit BDU' do not overlap in a plan view.

Figure 21:
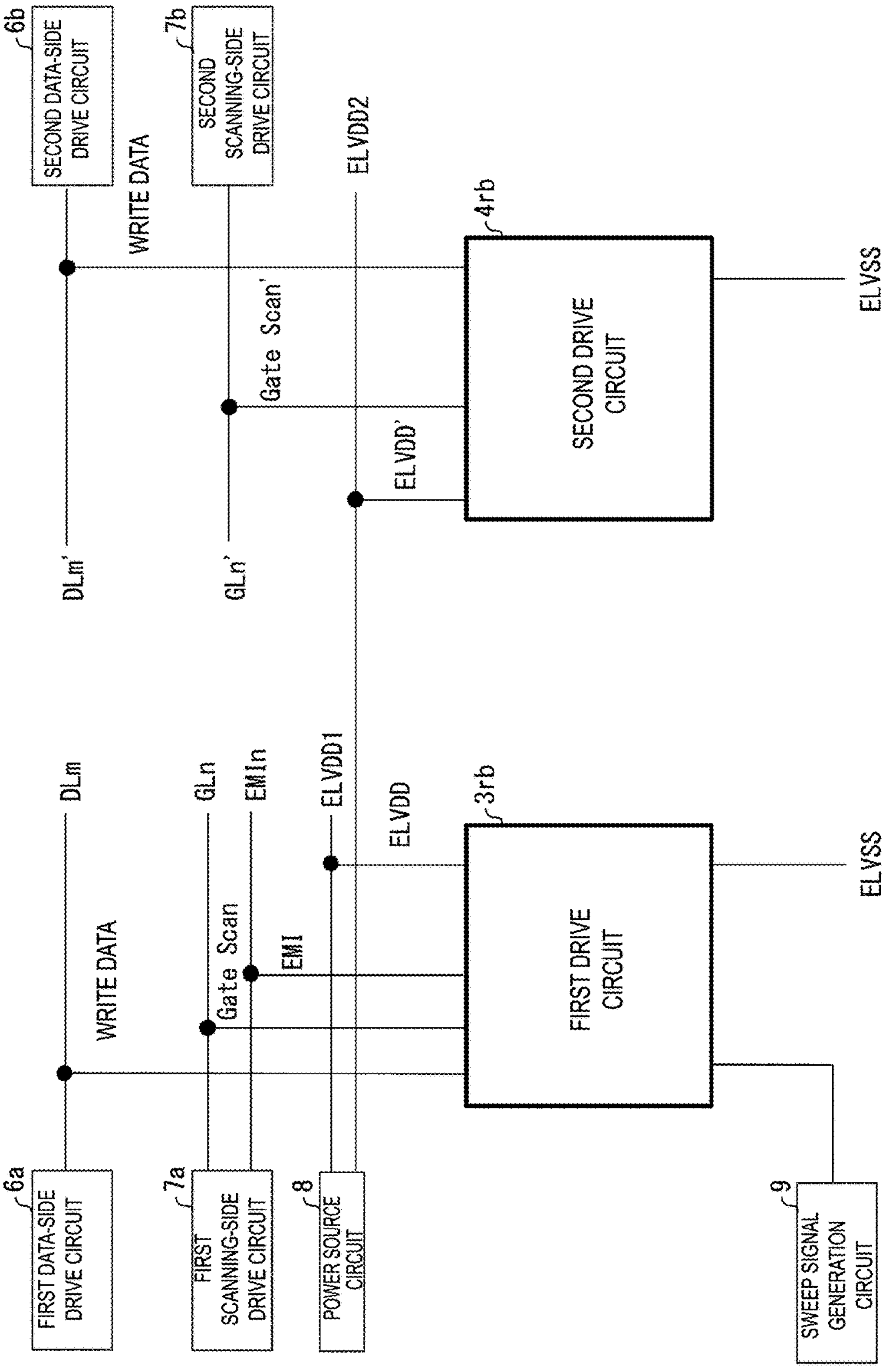
FIG. 21 is a diagram illustrating peripheral circuits that supply various signals to a first drive circuit and/or a second drive circuit included in the display panel illustrated in FIG. 19 or 20.

FIG. 21 is a diagram illustrating peripheral circuits that supply various signals to a first drive circuit 3*rb* including the first light-emitting element 3*ra* that emits red light and/or a second drive circuit 4*rb* including the second light-emitting element 4*ra* that emits red light, which are included in the display panels 2*g* and 2*h* illustrated in FIG. 19 and FIG. 20, respectively.

The first drive circuit 3*rb* illustrated in FIG. 21 can be configured in the same way as the first drive circuit 3*b* illustrated in FIG. 5, except that the first drive circuit 3*rb* includes the first light-emitting element 3*ra* that emits red light as a light-emitting element, and thus description thereof will be omitted here.

As illustrated in FIG. 21, the first drive circuit 3*rb* is supplied with write data from a first data-side drive circuit 6*a* via a data signal line DLm, a gate scanning signal from a first scanning-side drive circuit 7*a* via a scanning signal line GLn, an EMI signal from the first scanning-side drive circuit 7*a* via a light emission control line EMIn, a T1-G1 signal (see FIG. 6) from the first scanning-side drive circuit 7*a* via a T1-G1 signal line (not illustrated), a T2-G2 signal (see FIG. 6) from the first scanning-side drive circuit 7*a* via a T2-G2 signal line (not illustrated), a first high-potential-side power supply voltage ELVDD from a power source circuit 8 via a first high-potential-side power supply voltage wiring line ELVDD1, and a sweep signal from a sweep signal generation circuit 9 via a sweep signal line.

On the other hand, as illustrated in FIG. 21, the second drive circuit 4*rb* is supplied with write data from a second data-side drive circuit 6*b* via a data signal line DLm', a gate scanning signal (gate scan') from a second scanning-side drive circuit 7*b* via a scanning signal line GLn', and a second high-potential-side power supply voltage ELVDD' from the power source circuit 8 via a second high-potential-side power supply voltage wiring line ELVDD2.

The T1-G1 signal (see FIG. 6), the T2-G2 signal (see FIG. 6), and the sweep signal need not be supplied to the second drive circuits 4*rb* that include the second light-emitting elements 4*ra*, 4*ga*, and 4*ba*, which are driven by current. The EMI signal does not need to be supplied to the second drive circuit 4*rb* when the light is to be emitted immediately after writing. Note that when a predetermined interval is provided between a write period and a light emission period, it is preferable to use an EMI signal.

Figure 22:
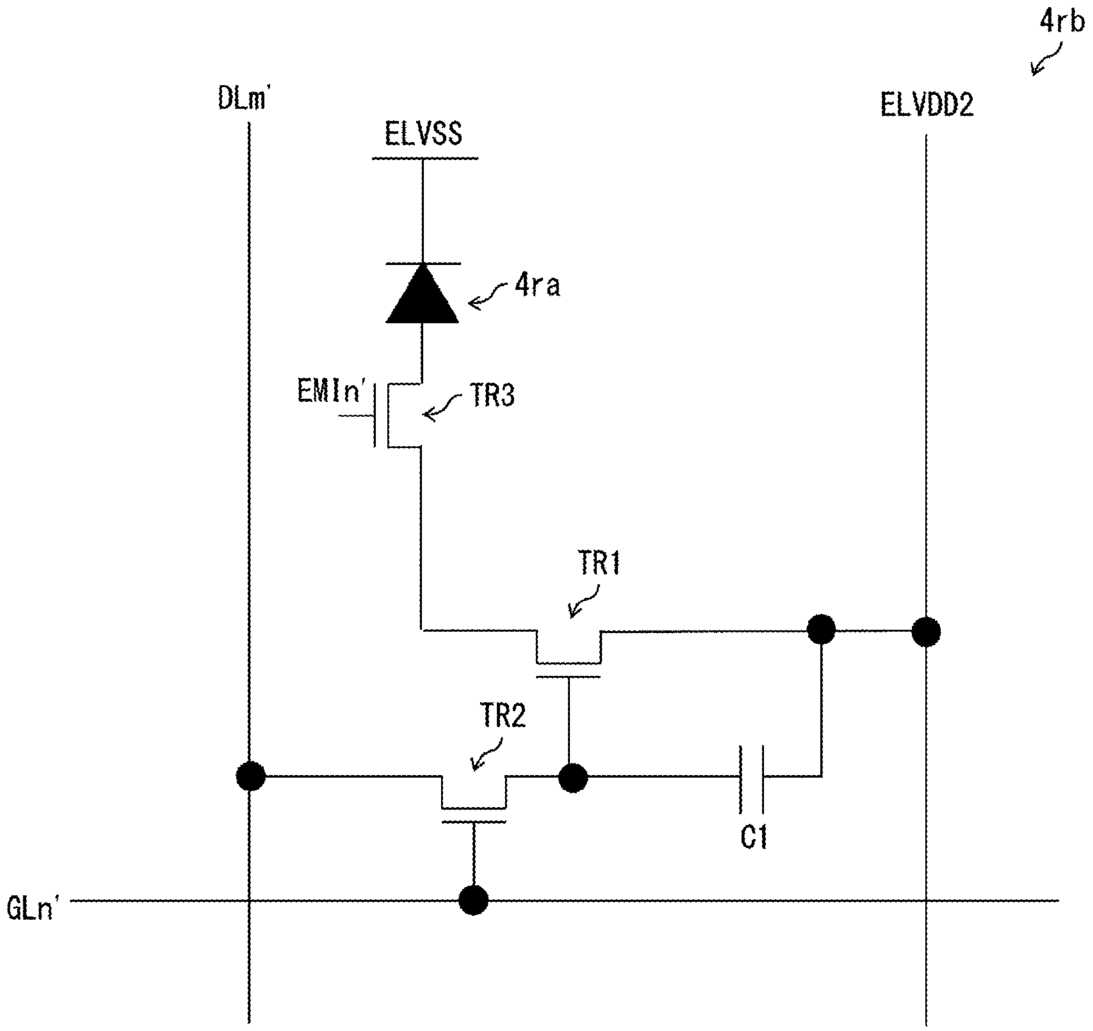
FIG. 22 is a circuit diagram illustrating a schematic configuration of the second drive circuit included in the display panels illustrated in FIGS. 19 and 20, respectively.

FIG. 22 is a circuit diagram illustrating a schematic configuration of the second drive circuit 4*rb* included in the display panels 2*g* and 2*h* illustrated in FIGS. 19 and 20, respectively.

As illustrated in FIG. 22, the second drive circuit 4*rb* includes a capacitor C1, a transistor TR1, and a transistor TR2. The transistor TR2 is turned on during a period when the gate scanning signal supplied via the scanning signal line GLn' is high, and write data supplied via the data signal line DLm' can be written to the capacitor C1. During this period, the transistor TR1 is also turned on, and a current corresponding to a difference between a combine voltage of the second high-potential-side power supply voltage supplied via the second high-potential-side power supply voltage wiring line ELVDD2 and the voltage corresponding to the write data written to the capacitor C1, and a low-potential-side power supply voltage ELVSS flows through the second light-emitting element 4*ra*.

As illustrated in FIG. 22, the second drive circuit 4*rb* may further include a transistor TR3 including a gate electrode to which an EMI signal is supplied via a light emission control line EMIn'. Since a timing at which the transistor TR3 is turned on can be controlled by the EMI signal, when such a transistor TR3 is included, the light emission timing can be easily adjusted.

Figure 23:
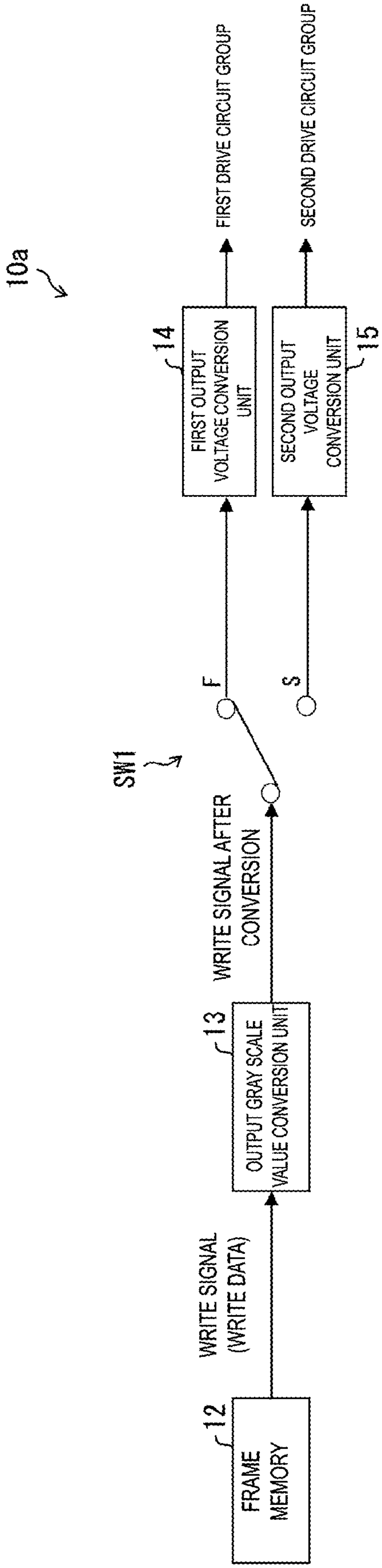
FIG. 23 is a diagram illustrating some components of a control device included in the display device according to the fourth embodiment.

FIG. 23 is a diagram illustrating some components of a control device 10*a* included in the display device according to the fourth embodiment.

Figure 24:
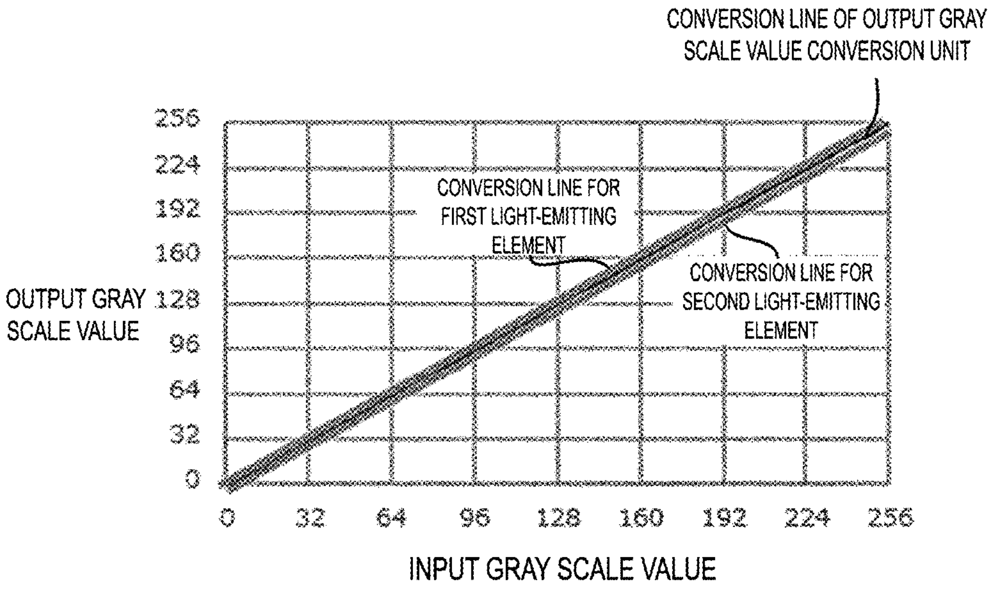
FIG. 24 is a diagram showing examples of conversion lines for converting a predetermined input gray scale value into a predetermined output gray scale value, which can be used in an output gray scale value conversion unit included in the control device illustrated in FIG. 23.

FIG. 24 is a diagram showing examples of conversion lines for converting a predetermined input gray scale value into a predetermined output gray scale value, which can be used in an output gray scale value conversion unit 13 included in the control device 10*a* illustrated in FIG. 23.

Figure 25:
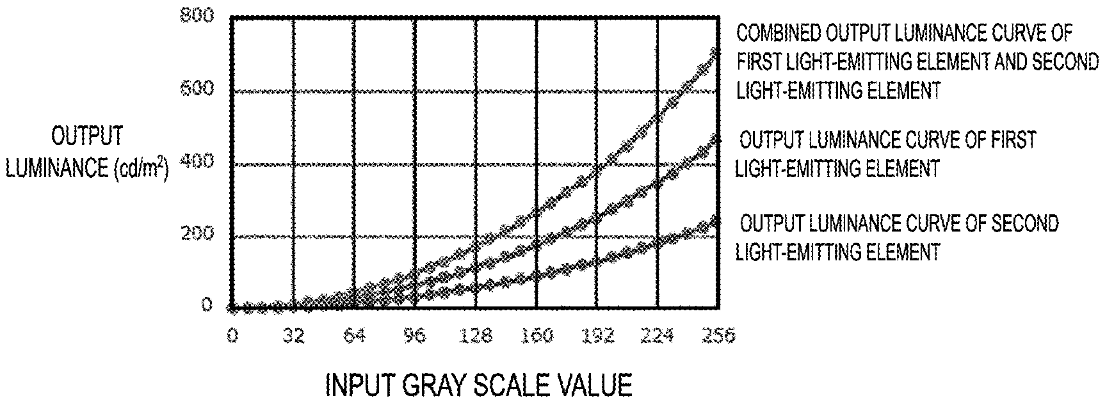
FIG. 25 is a diagram showing examples of various curves showing a relationship between the input gray scale value and output luminance, which can be used for determining a conversion line for converting a predetermined input gray scale value into a predetermined output gray scale value shown in FIG. 24.

FIG. 25 is a diagram showing examples of various curves showing a relationship between the input gray scale value and output luminance, which can be used for determining a conversion line for converting a predetermined input gray scale value into a predetermined output gray scale value shown in FIG. 24.

As illustrated in FIG. 23, the control device 10*a* included in the display device according to the fourth embodiment may include the output gray scale value conversion unit 13, a first output voltage conversion unit 14, a second output voltage conversion unit 15, and a switching element SW1 that switches between a first connection state F and a second connection state S.

The output gray scale value conversion unit 13 converts the input image data into a write signal to be supplied to a first drive circuit group and a write signal to be supplied to a second drive circuit group.

As shown in FIG. 25, the first output voltage conversion unit 14 converts the output signal to match the output luminance curve of the first light-emitting element so that y, which is the output luminance for the write signal (input gray scale value) supplied to the first drive circuit group, becomes 2.2, and the second output voltage conversion unit 15 converts the output signal to match the output luminance curve of the second light-emitting element so that y, which is the output luminance for the write signal (input gray scale value) supplied to the second drive circuit group, becomes 2.2. Note that the output luminance curve of the first light-emitting element and the output luminance curve of the second light-emitting element shown in FIG. 25 are output luminance curves taking into consideration the off time.

In the present embodiment, it is assumed that the second light-emitting element emits light only for about one third of one frame period, so that the output luminance is set to 240 cd/m$^2$ at the maximum gray scale value, but is not limited to this value. As long as a combined output luminance curve of the first light-emitting element and the second light-emitting element shown in FIG. 25 can be obtained, the output luminance curve of the first light-emitting element and the output luminance curve of the second light-emitting element may be adjusted appropriately.

In the first to third embodiments described above, for example, an input gray scale value is converted into a predetermined output gray scale value using one conversion line such as a conversion line of an output gray scale value conversion unit shown in FIG. 24, but in the present embodiment, the input gray scale value is converted into the predetermined output gray scale value using two different conversion lines such as the first light-emitting element conversion line and the second light-emitting element conversion line shown in FIG. 24. The conversion of the input gray scale value into a predetermined output gray scale value can be performed using, for example, a look-up table.

In a case of the display device according to the fourth embodiment, it is preferable to have a first look-up table created based on a conversion line for the first light-emitting element that emits red light, a second look-up table created based on a conversion line for the first light-emitting element that emits green light, a third look-up table created based on a conversion line for the first light-emitting element that emits blue light, a fourth look-up table created based on a conversion line for the second light-emitting element that emits red light, a fifth look-up table created based on a conversion line for the second light-emitting element that emits green light, and a sixth look-up table created based on a conversion line for the second light-emitting element that emits blue light.

In the present embodiment, a case has been described as an example in which the first light-emitting element is PWM driven and the second light-emitting element is current driven, but this case is just an example, and the first light-emitting element and the second light-emitting element may be current driven.

Figure 26:
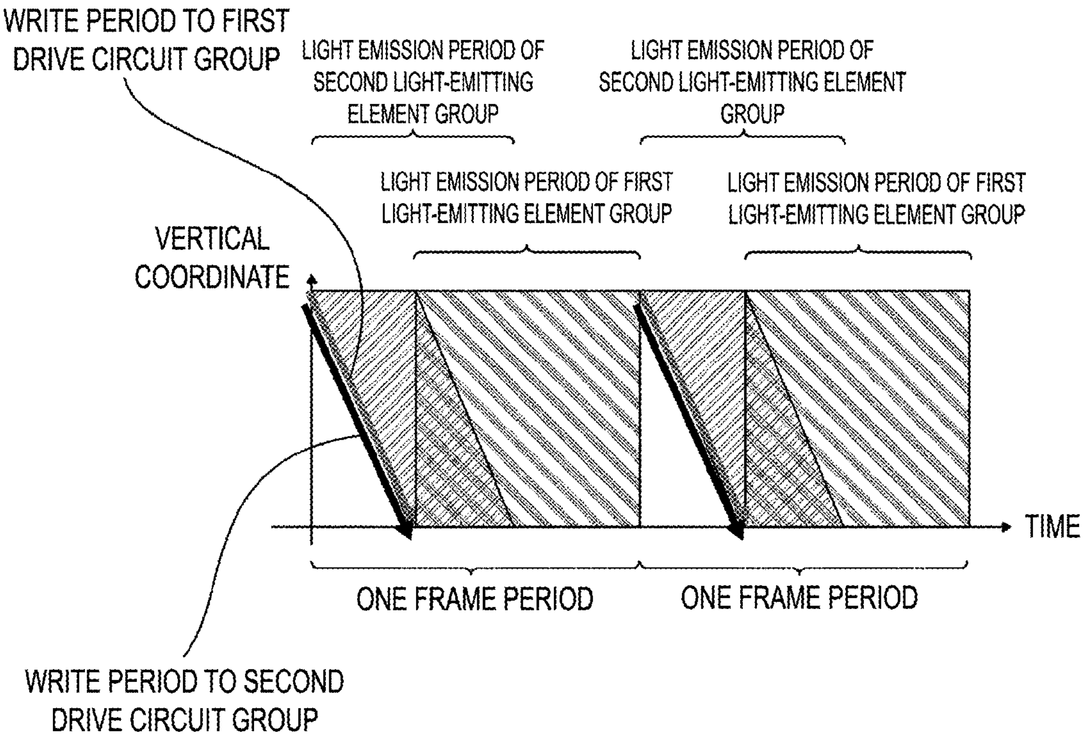
FIG. 26 is a diagram illustrating an example of a drive timing for driving the display panel included in the display device according to the fourth embodiment.

FIG. 26 is a diagram illustrating an example of a drive timing for driving the display panel included in the display device according to the fourth embodiment.

As illustrated in FIG. 26, a timing control unit (control unit) of the control device included in the display device according to the fourth embodiment may sequentially write data to the multiple second drive circuits based on the input image data for n rows, row by row, during a write period to the second drive circuit group, and may sequentially cause the multiple second light-emitting elements included in the multiple second drive circuits in the row in which the writing is completed, to emit light.

As illustrated in FIG. 26, the timing control unit (control unit) of the control device included in the display device according to the fourth embodiment may sequentially write data to the multiple second drive circuits based on the input image data for n rows, row by row, during a write period to the first drive circuit group (write period), and may sequentially cause the multiple second light-emitting elements to emit light at least row by row out of the n rows during the write period to the first drive circuit group and at least part of the light emission period of the first light-emitting element group. Note that in this case, a wiring line for supplying a write signal from a frame memory 12 (see FIGS. 1 and 2) to the first data-side drive circuit (not illustrated) and a wiring line for supplying a write signal from the frame memory 12 to the second data-side drive circuit (not illustrated) are separately included without passing through the switching element SW1 (see FIGS. 1 and 2). Therefore, the timing control unit of the control device included in the display device according to the fourth embodiment, during the one frame period, writes the input image data to the frame memory 12 once, and reads the input image data from the frame memory 12 once via the wiring line for supplying the write signal to the first data-side drive circuit described above and reads the input image data once via the wiring line for supplying the write signal to the second data-side drive circuit described above, so that the input image data is read from the frame memory 12 twice.

When the display panel is driven as illustrated in FIG. 26, since the second light-emitting element emits light during the write period to the first drive circuit group, it is possible to eliminate the period during which light is not emitted simultaneously over the entire surface due to the write period within one frame period without increasing the frame frequency for driving the display panel, thereby suppressing flicker.

Figure 27:
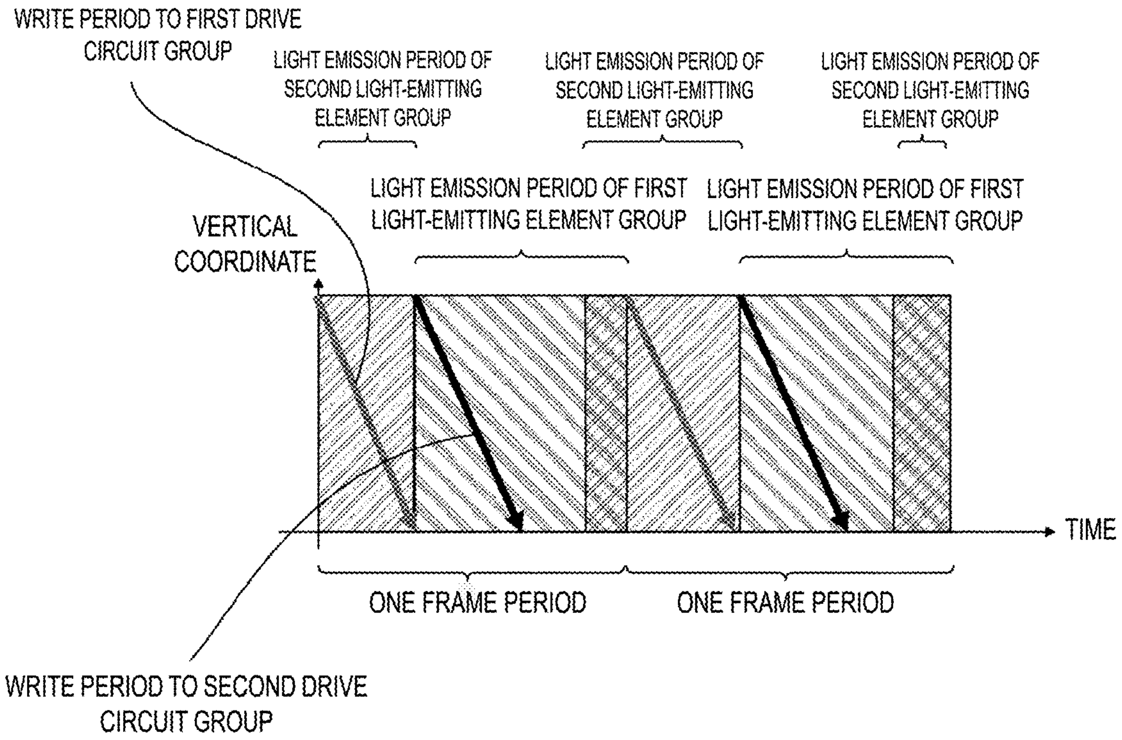
FIG. 27 is a diagram illustrating an example of another drive timing for driving the display panel included in the display device according to the fourth embodiment.

FIG. 27 is a diagram illustrating an example of another drive timing for driving the display panel included in the display device according to the fourth embodiment.

As illustrated in FIG. 27, the timing control unit (control unit) of the control device included in the display device according to the fourth embodiment may sequentially write data to the multiple second drive circuits based on the input image data for n rows, row by row, during a first period of the light emission period of the first light-emitting element group, and may cause the multiple second light-emitting elements included in the multiple second drive circuits in the n rows to collectively emit light during a write period to the first drive circuit group after the first period and during a second period of the light emission period of the first light-emitting element group after the first period.

When the display panel is driven as illustrated in FIG. 27, since the second light-emitting element emits light during the write period to the first drive circuit group, it is possible to eliminate the period during which light is not emitted simultaneously over the entire surface due to the write period within one frame period without increasing the frame frequency for driving the display panel, thereby suppressing flicker. During a latter half of the light emission period of the first light-emitting element group, many of the first light-emitting elements are turned off when displaying gray levels or less, so that by turning on the second light-emitting elements during this period, the light emission period of the second light-emitting element group can be extended, thereby suppressing flicker visibility.

Figure 28:
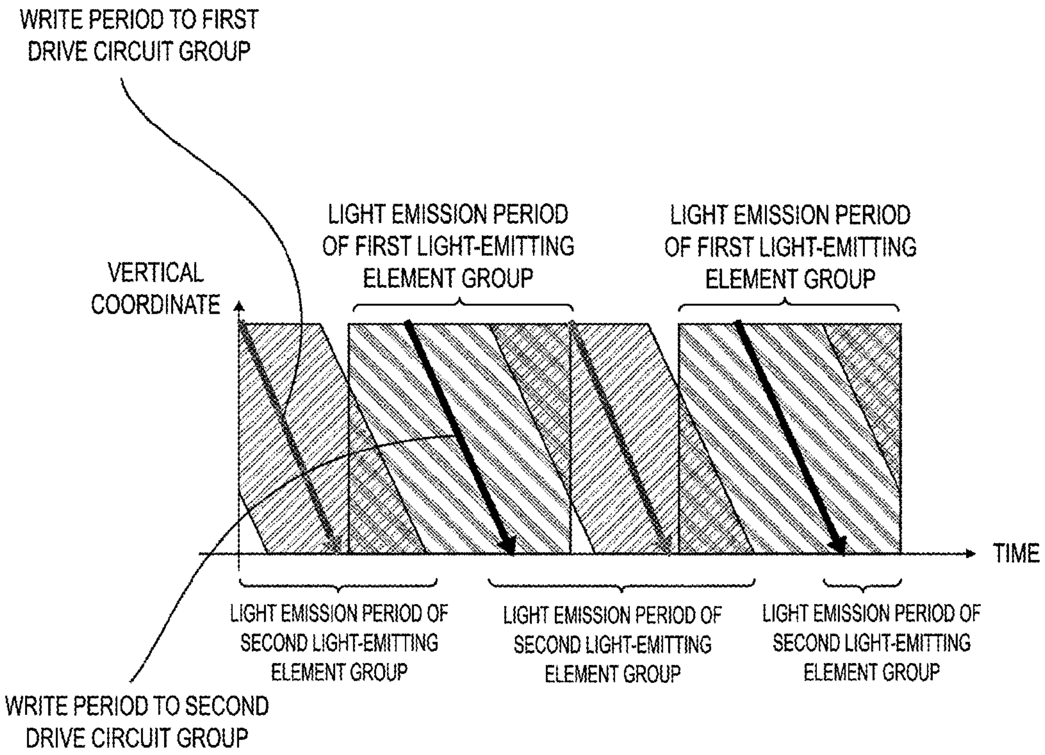
FIG. 28 is a diagram illustrating an example of still another drive timing for driving the display panel included in the display device according to the fourth embodiment.

FIG. 28 is a diagram illustrating an example of still another drive timing for driving the display panel included in the display device according to the fourth embodiment.

As illustrated in FIG. 28, the timing control unit (control unit) of the control device included in the display device according to the fourth embodiment may sequentially write data to the multiple second drive circuits based on the input image data for n rows, row by row, during a first period of the light emission period of the first light-emitting element group, and may sequentially cause the multiple second light-emitting elements to emit light at least row by row out of the n rows during part of the first period, a second period of the light emission period of the first light-emitting element group after the first period, and a write period to the first drive circuit group after the first period.

When the display panel is driven as illustrated in FIG. 28, since the second light-emitting element emits light during the write period to the first drive circuit group, it is possible to eliminate the period during which light is not emitted simultaneously over the entire surface due to the write period within one frame period without increasing the frame frequency for driving the display panel, thereby suppressing flicker.

Figure 29:
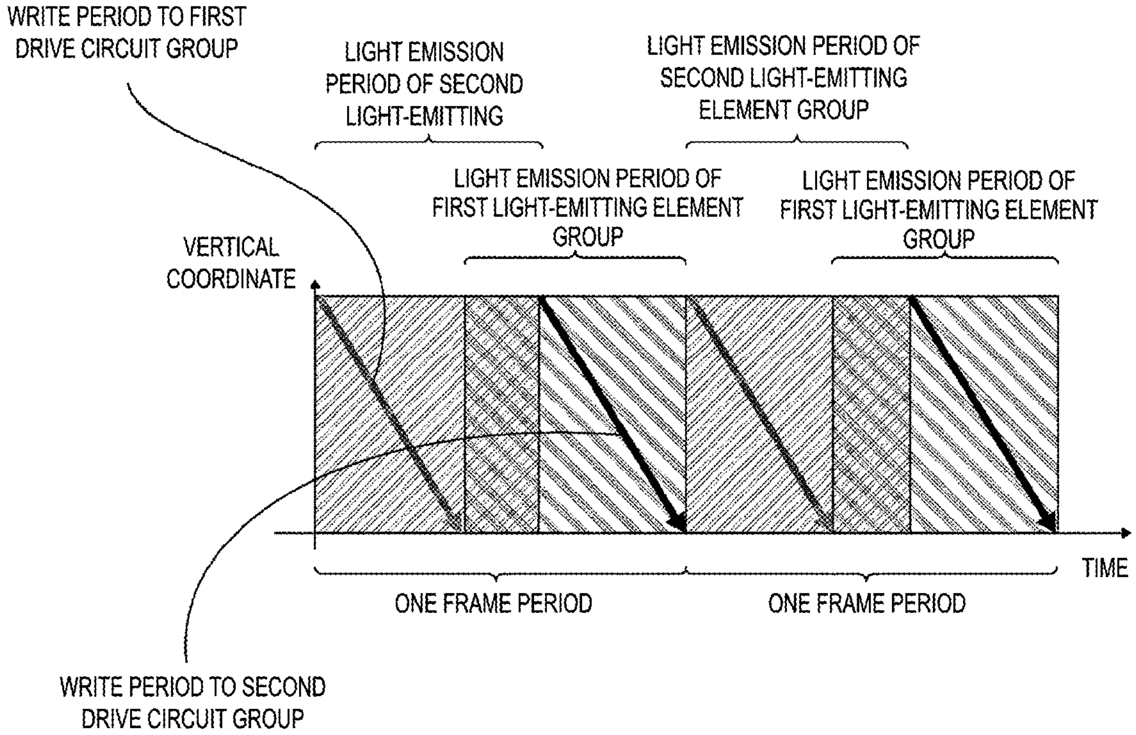
FIG. 29 is a diagram illustrating an example of still another drive timing for driving the display panel included in the display device according to the fourth embodiment.

FIG. 29 is a diagram illustrating an example of still another drive timing for driving the display panel included in the display device according to the fourth embodiment.

The light emission period of the first light-emitting element group illustrated in FIG. 29 includes a first period and a second period after the first period.

As illustrated in FIG. 29, the timing control unit (control unit) of the control device included in the display device according to the fourth embodiment may sequentially write data to the multiple second drive circuits based on input image data for n rows, row by row, during the second period of the light emission period of the first light-emitting element group, and may cause the multiple second light-emitting elements included in the multiple second drive circuits in the n rows to collectively emit light during the write period to the first drive circuit group after the second period and during the first period of the light emission period of the first light-emitting element group after the second period.

When the display panel is driven as illustrated in FIG. 29, since the second light-emitting element emits light during the write period to the first drive circuit group, it is possible to eliminate the period during which light is not emitted simultaneously over the entire surface due to the write period within one frame period without increasing the frame frequency for driving the display panel, thereby suppressing flicker.

Figure 30:
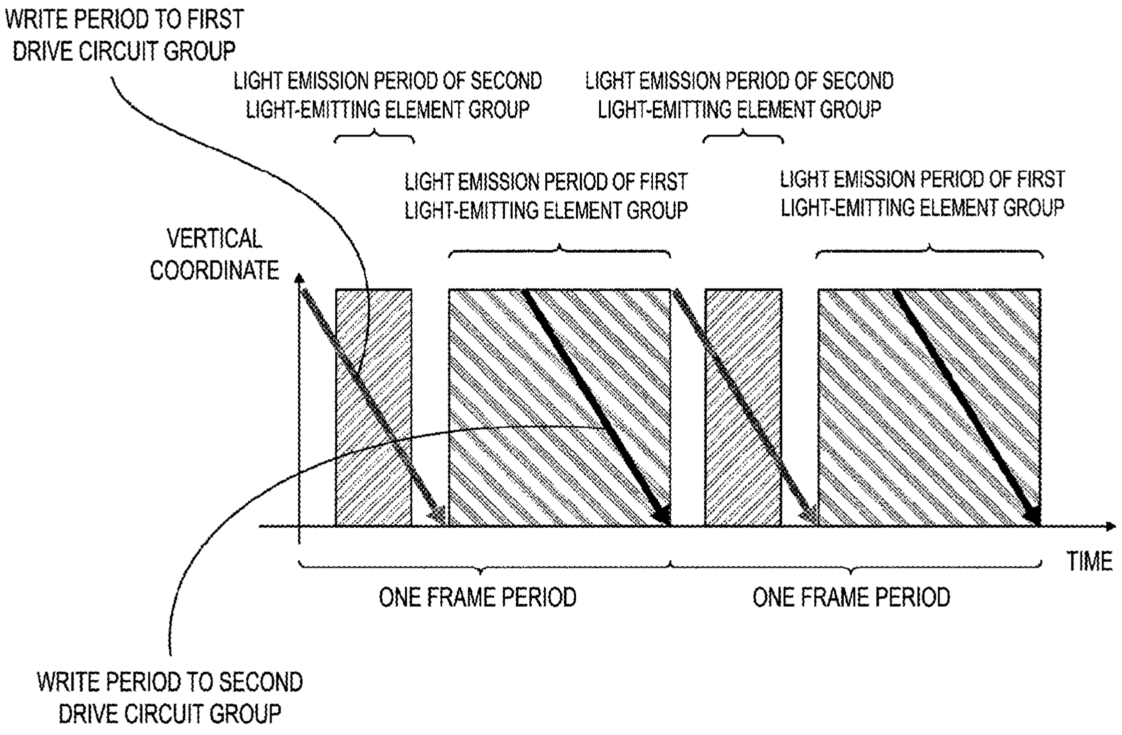
FIG. 30 is a diagram illustrating an example of still more another drive timing for driving the display panel included in the display device according to the fourth embodiment.

FIG. 30 is a diagram illustrating an example of still more another drive timing for driving the display panel included in the display device according to the fourth embodiment.

The write period to the first drive circuit group illustrated in FIG. 30 includes a first period, a second period after the first period, and a third period after the second period.

As illustrated in FIG. 30, the timing control unit (control unit) of the control device included in the display device according to the fourth embodiment may sequentially write data to the multiple second drive circuits based on the input image data for n rows, row by row, during the light emission period of the first light-emitting element group, and may cause the multiple second light-emitting elements included in the multiple second drive circuits in the n rows to collectively emit light during the second period after the light emission period of the first light-emitting element group.

When the display panel is driven as illustrated in FIG. 30, since the second light-emitting element emits light during the write period to the first drive circuit group, it is possible to eliminate the period during which light is not emitted simultaneously over the entire surface due to the write period within one frame period without increasing the frame frequency for driving the display panel, thereby suppressing flicker.

Fifth Embodiment

Next, a fifth embodiment of the disclosure will be described with reference to FIGS. 31 to 37. The present embodiment is different from the above-described fourth embodiment in that, in display panels 2*i* and 2*j* included in a display device according to the present embodiment, display units RDU, RDU', GDU, GDU', BDU, and BDU' are composed of different numbers of first light-emitting elements and second light-emitting elements. Other configurations are as described in the fourth embodiment. For convenience of explanation, members having the same functions as those of the members illustrated in the drawings in the fourth embodiment are denoted by the same reference numerals and signs, and descriptions thereof will be omitted.

Figure 31:
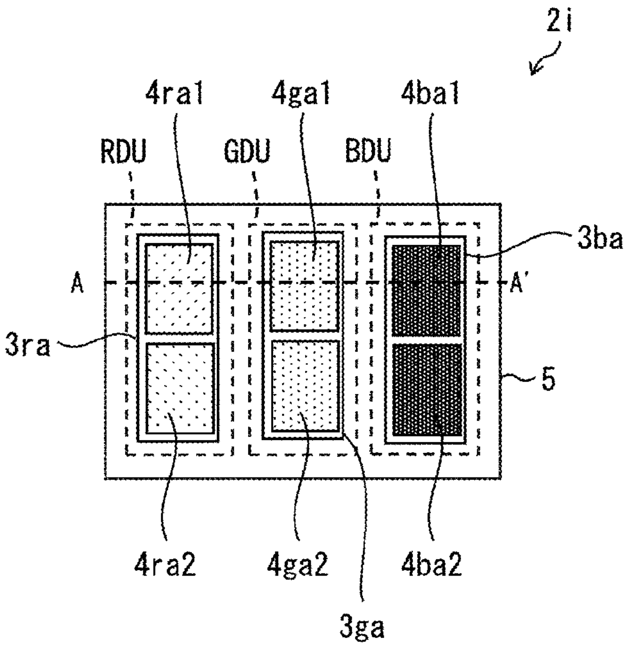
FIG. 31 is a plan view illustrating a schematic configuration of a display panel included in a display device according to a fifth embodiment.

FIG. 31 is a plan view illustrating a schematic configuration of the display panel 2*i* included in the display device according to the fifth embodiment.

Figure 32:
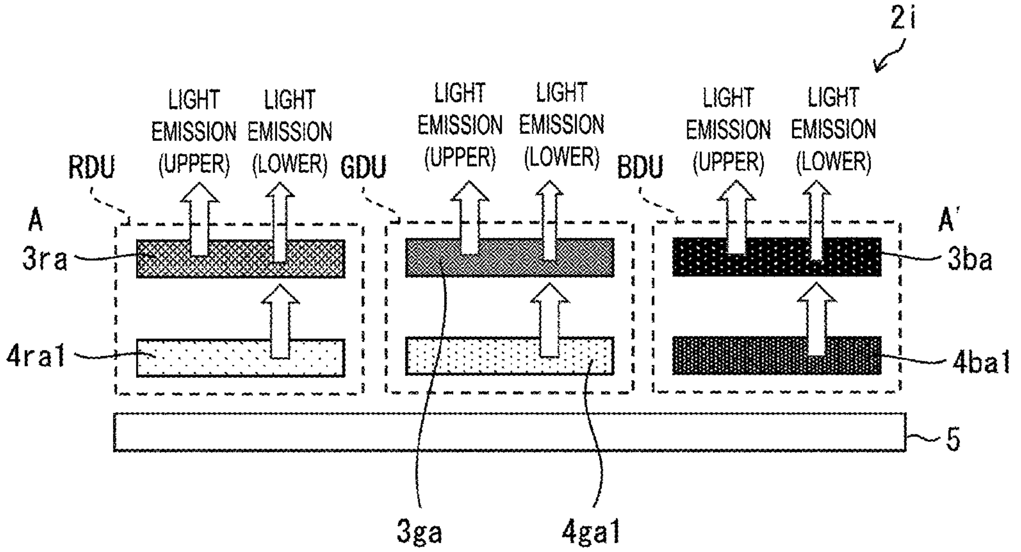
FIG. 32 is a cross-sectional view taken along a line A-A' of the display panel included in the display device according to the fifth embodiment illustrated in FIG. 31.

FIG. 32 is a cross-sectional view taken along a line A-A' of the display panel 2*i* included in the display device according to the fifth embodiment illustrated in FIG. 31.

As illustrated in FIGS. 31 and 32, the display unit RDU, which is a red subpixel included in the display panel 2*i*, includes one first light-emitting element 3_ra_ that emits red light and two second light-emitting elements 4_ra_1 and 4_ra_2 that emit red light, the display unit GDU, which is a green subpixel included in the display panel 2_i_, includes one first light-emitting element 3_ga_ that emits green light and two second light-emitting elements 4_ga_1 and 4_ga_2 that emit green light, and the display unit BDU, which is a blue subpixel included in the display panel 2_i_, includes one first light-emitting element 3_ba_ that emits blue light and two second light-emitting elements 4_ba_1 and 4_ba_2 that emit blue light.

As illustrated in FIGS. 31 and 32, in each of the display units RDU, GDU, and BDU included in the display panel 2_i_, the first light-emitting element and the second light-emitting elements overlap in a plan view.

Figure 33:
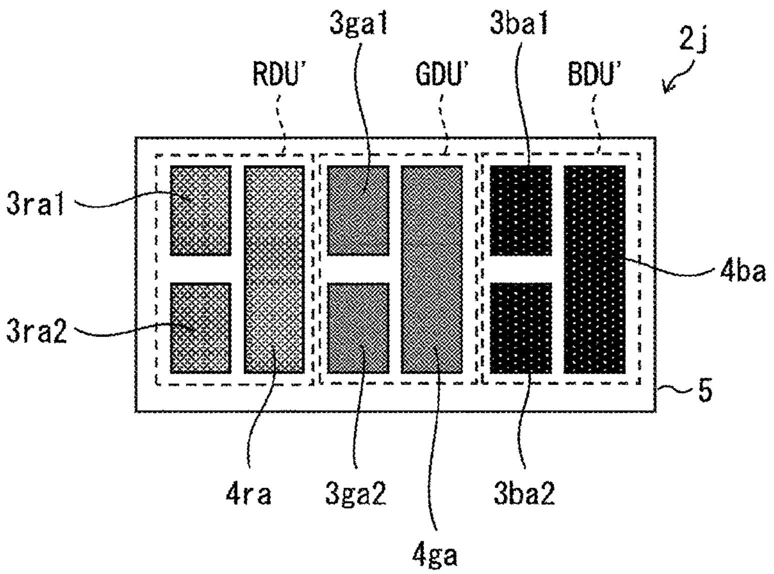
FIG. 33 is a plan view illustrating a schematic configuration of another display panel that can be included in the display device according to the fifth embodiment.

FIG. 33 is a plan view illustrating a schematic configuration of the other display panel 2_j_ that can be included in the display device according to the fifth embodiment.

As illustrated in FIG. 33, the display unit RDU', which is a red subpixel included in the display panel 2_j_, includes two first light-emitting elements 3_ra_1 and 3_ra_2 that emit red light and one second light-emitting element 4_ra_ that emits red light, the display unit GDU', which is a green subpixel included in the display panel 2_j_, includes two first light-emitting elements 3_ga_1 and 3_ga_2 that emit green light and one second light-emitting element 4_ga_ that emits green light, and the display unit BDU', which is a blue subpixel included in the display panel 2_j_, includes two first light-emitting elements 3_ba_1 and 3_ba_2 that emit blue light and one second light-emitting element 4_ba_ that emits blue light.

As illustrated in FIG. 33, in each of the display units RDU', GDU', and BDU' included in the display panel 2_j_, the first light-emitting elements and the second light-emitting element do not overlap in a plan view.

As described above, the number of the multiple first light-emitting elements and the number of the multiple second light-emitting elements included in the display panels 2_i_ and 2_j_ are different, and the number of the first light-emitting elements and the number of the second light-emitting elements included in each of the multiple display units are different.

By causing the multiple first light-emitting elements and the multiple second light-emitting elements included in each of the display units RDU, GDU, BDU, RDU', GDU', and BDU' to emit light based on the same gray scale value, it is not necessary to increase the number of first drive circuits and the number of second drive circuits.

Figure 34:
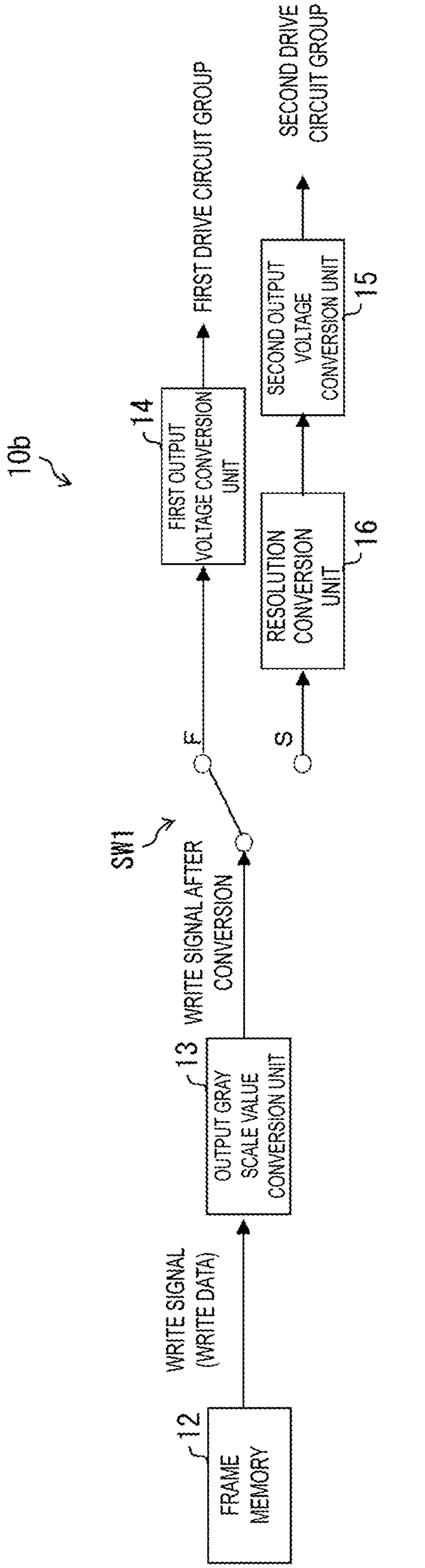
FIG. 34 is a diagram illustrating some components of a control device included in the display device according to the fifth embodiment.

FIG. 34 is a diagram illustrating some components of a control device 10_b_ included in the display device according to the fifth embodiment.

As illustrated in FIG. 34, the control device 10_b_ included in the display device according to the fifth embodiment may include an output gray scale value conversion unit 13, a first output voltage conversion unit 14, a second output voltage conversion unit 15, a resolution conversion unit 16, and a switching element SW1 that switches between a first connection state F and a second connection state S.

Figure 35:
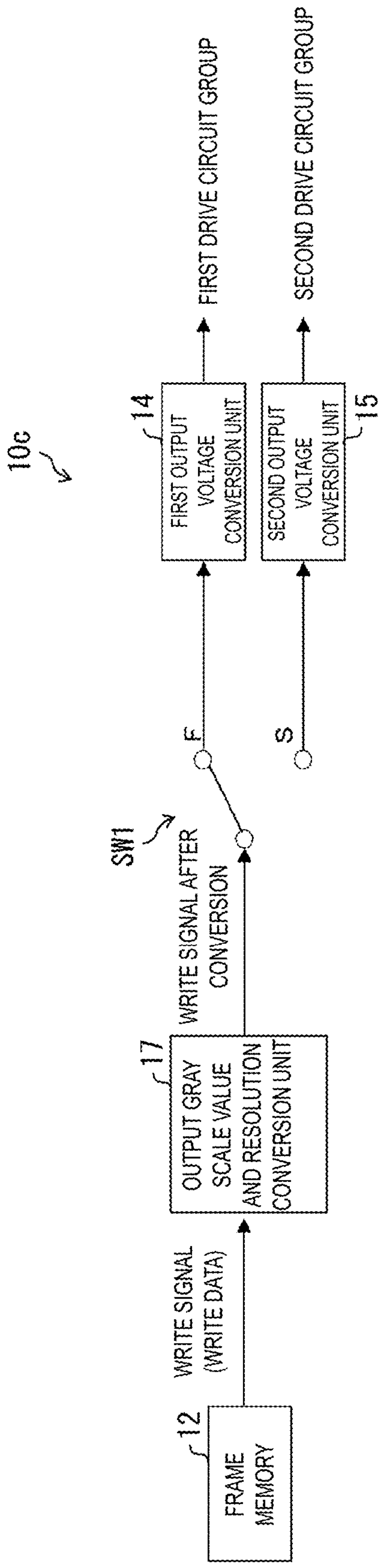
FIG. 35 is a diagram illustrating some components of another control device that can be included in the display device according to the fifth embodiment.

FIG. 35 is a diagram illustrating some components of another control device 10_c_ that can be included in the display device according to the fifth embodiment.

As illustrated in FIG. 35, the control device 10_c_ included in the display device according to the fifth embodiment may include an output gray scale value and a resolution conversion unit 17 that has the function of the resolution conversion unit 16 illustrated in FIG. 34, the first output voltage conversion unit 14, the second output voltage conversion unit 15, and the switching element SW1 that switches between the first connection state F and the second connection state S.

Figure 36:
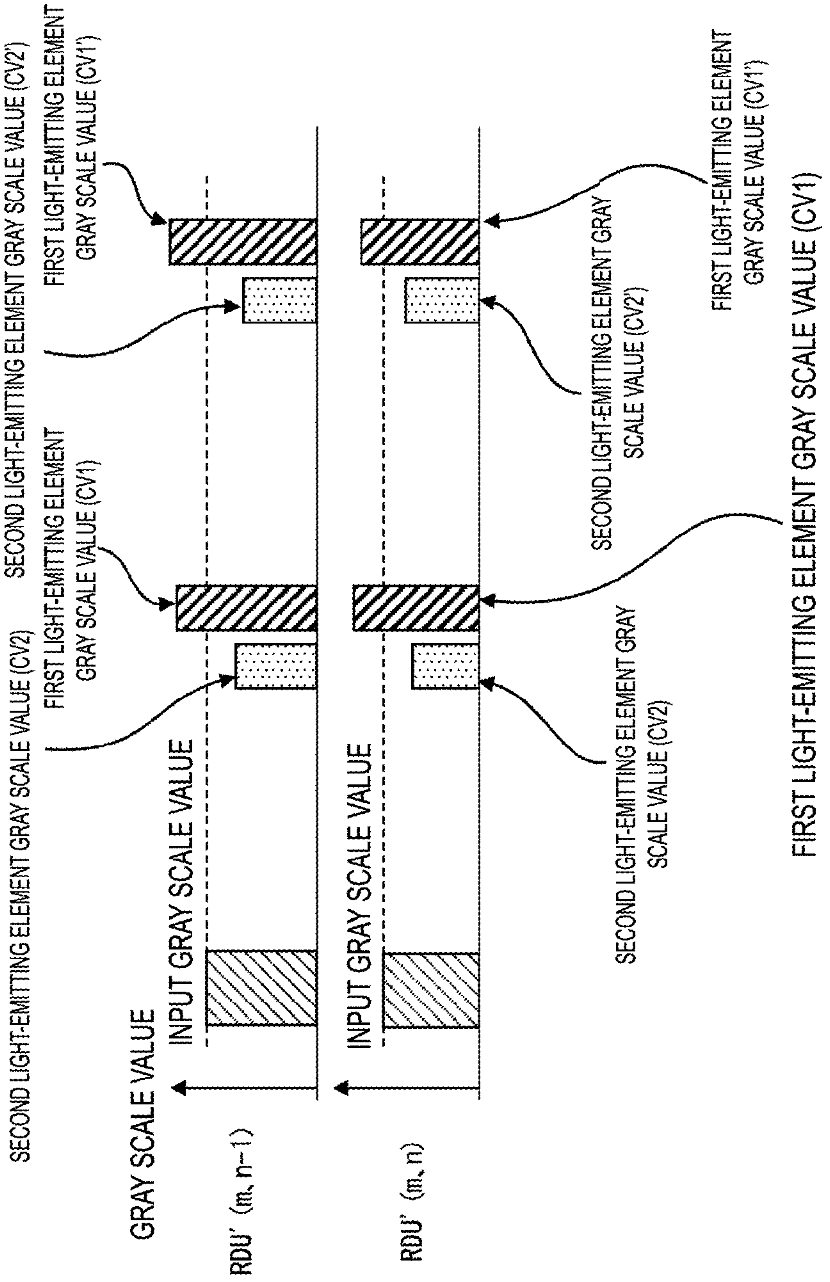
FIG. 36 is a diagram illustrating an example of resolution conversion performed in the control device illustrated in FIG. 34 or 35.

FIG. 36 is a diagram illustrating an example of resolution conversion performed in the control devices 10_b_ and 10_c_ illustrated in FIGS. 34 and 35, respectively.

As illustrated in FIG. 36, for example, when similar input image data having predetermined input gray scale values are input to two adjacent display units RDU'(m, n−1) and RDU'(m, n), the resolution conversion unit 16 or the output gray scale value and resolution conversion unit 17 separately determines a first light-emitting element gray scale value (CV1) and a second light-emitting element gray scale value (CV2) in each of the display unit RDU'(m, n−1) and the display unit RDU'(m, n). Further, a mean (CV2') of the second light-emitting element gray scale value (CV2) of the display unit RDU'(m, n−1) and the second light-emitting element gray scale value (CV2) of the display unit RDU'(m, n) may be calculated, the first light-emitting element gray scale value (CV1') of the display unit RDU'(m, n−1) and the first light-emitting element gray scale value (CV1') of the display unit RDU'(m, n) may be recalculated based on this mean (CV2'), and the display unit RDU'(m, n−1) and the display unit RDU'(m, n) may be caused to emit light based on these values.

As described above, by performing the resolution conversion, for example, the second light-emitting element of the display unit RDU'(m, n−1) and the second light-emitting element of the display unit RDU'(m, n) can be caused to emit light using one second drive circuit, thereby reducing the number of second drive circuits.

Figure 37:
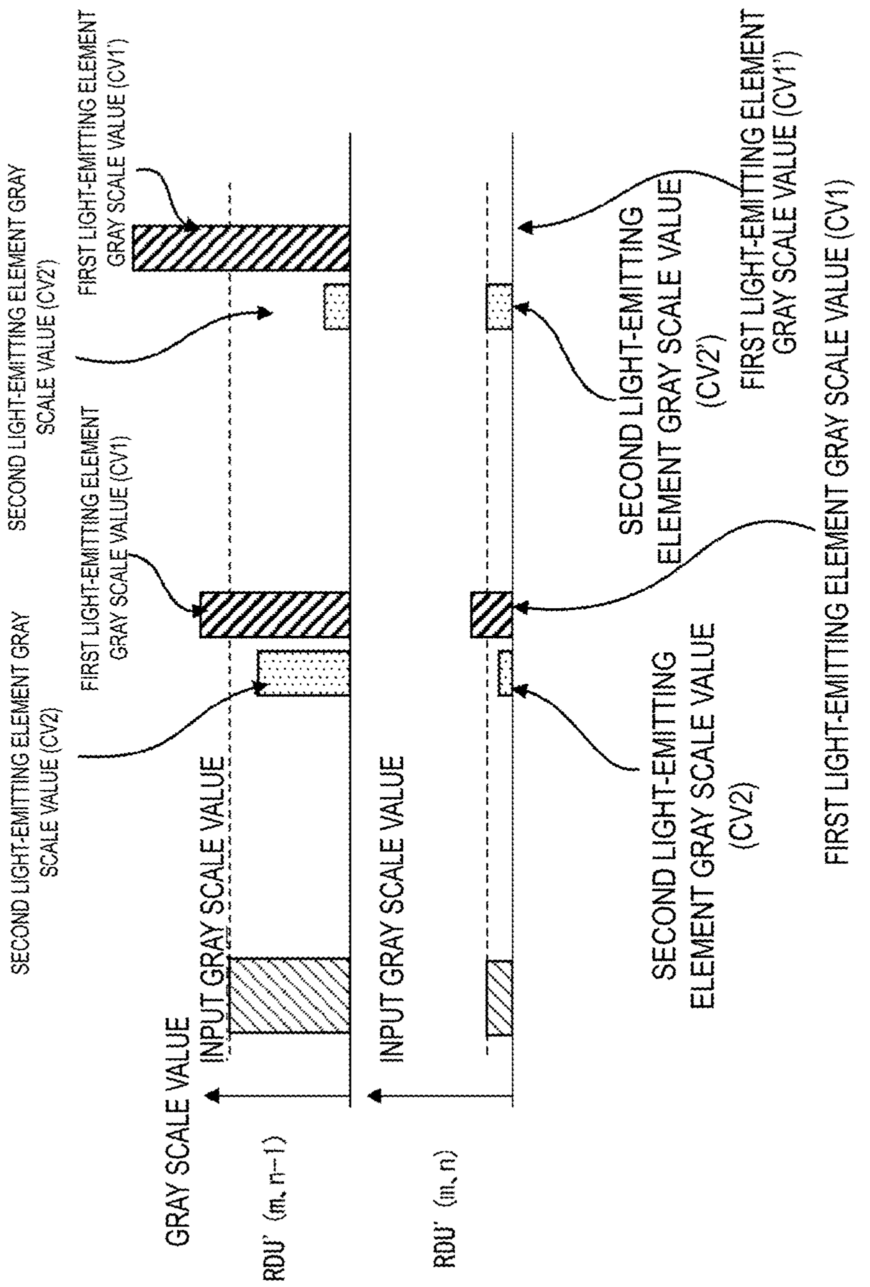
FIG. 37 is a diagram illustrating another example of resolution conversion performed in the control device illustrated in FIG. 34 or 35.

FIG. 37 is a diagram illustrating another example of resolution conversion performed in the control devices 10_b_ and 10_c_ illustrated in FIGS. 34 and 35, respectively.

As illustrated in FIG. 37, for example, when largely different input image data having predetermined input gray scale values are input to two adjacent display units RDU'(m, n−1) and RDU'(m, n), the resolution conversion unit 16 or the output gray scale value and resolution conversion unit 17 separately determines the first light-emitting element gray scale value (CV1) and the second light-emitting element gray scale value (CV2) in each of the display unit RDU'(m, n−1) and the display unit RDU'(m, n). Further, in the display unit RDU'(m, n) having a smaller input gray scale value, the first light-emitting element gray scale value (CV1') and the second light-emitting element gray scale value (CV2') may be recalculated so as to cause only the second light-emitting element to emit light, and in the display unit RDU'(m, n−1) having a larger input gray scale value, the second light-emitting element gray scale value (CV2') may be adjusted to the second light-emitting element gray scale value (CV2') of the display unit RDU'(m, n), and the first light-emitting element gray scale value (CV1') of the display unit RDU'(m, n−1) may be recalculated based on the second light-emitting element gray scale value (CV2') of the display unit RDU'(m, n−1), and the display unit RDU'(m, n−1) and the display unit RDU'(m, n) may be caused to emit light based on these values.

As described above, by performing the resolution conversion, for example, the second light-emitting element of the display unit RDU'(m, n−1) and the second light-emitting element of the display unit RDU'(m, n) can be caused to emit light using one second drive circuit, thereby reducing the number of second drive circuits.

Here, a case has been described as an example in which the number of second drive circuits can be reduced by performing resolution conversion, but this case is just an example, and the number of first drive circuits can also be reduced by performing resolution conversion.

APPENDIX

The disclosure is not limited to the embodiments described above, and various modifications may be made within the scope of the claims. Embodiments obtained by appropriately combining technical approaches disclosed in the different embodiments also fall within the technical scope of the disclosure. Furthermore, novel technical features can be formed by combining the technical approaches disclosed in each of the embodiments.

INDUSTRIAL APPLICABILITY

The disclosure can be utilized for a control device and a display device.

The invention claimed is:

1. A display device comprising:

a display panel; and a control device for the display panel, wherein the display panel includes:

a substrate, a plurality of display units, each including a first light-emitting element and a second light-emitting element, wherein the plurality of display units is arranged along n rows and m columns, where m and n are natural numbers of two or more, and a plurality of first drive circuits, each including the first light-emitting element, wherein the control device comprises a control unit that is configured to cause the display panel to display an image based on input image data, wherein the control unit, in a period during which a write period and a light emission period are alternately repeated:

during the write period, performs writing of data to the plurality of first drive circuits based on the input image data, during the light emission period, causes a plurality of first light-emitting elements to emit light, and during at least part of the write period, causes a plurality of second light-emitting elements to emit light, wherein:

the first light-emitting element and the second light-emitting element at least partially overlap in a plan view, and one of the first light-emitting element and the second light-emitting element is located farther from the substrate than the other one of the first light-emitting element and the second light-emitting element.

2. The display device according to claim 1, wherein:

the first light-emitting element is pulse width modulation (PWM)-driven such that luminance is controlled by changing a current flow time while keeping an amount of current flowing through the first light-emitting element constant, or the first light-emitting element is current-driven such that luminance is controlled by changing an amount of current flowing through the first light-emitting element, the second light-emitting element is PWM-driven such that luminance is controlled by changing a current flow time while keeping an amount of current flowing through the second light-emitting element constant, or the second light-emitting element is current-driven such that luminance is controlled by changing an amount of current flowing through the second light-emitting element, the display panel further includes a plurality of second drive circuits, each including the second light-emitting element, the write period and a period during which the control unit performs writing of data to the plurality of second drive circuits based on the input image data partially overlap, and the light emission period and a period during which the control unit causes the plurality of second light-emitting elements to emit light partially overlap.

3. The display device according to claim 1, wherein:

the first light-emitting element is PWM-driven such that luminance is controlled by changing a current flow time while keeping an amount of current flowing through the first light-emitting element constant, or the first light-emitting element is current-driven such that luminance is controlled by changing an amount of current flowing through the first light-emitting element, the second light-emitting element is current-driven such that luminance is controlled by changing an amount of current flowing through the second light-emitting element, the display panel further includes a plurality of second drive circuits, each including the second light-emitting element, and wherein the control unit:

during a first period of the light emission period, sequentially performs writing of data to the plurality of second drive circuits based on the input image data for the n rows, row by row, and during part of the first period, a second period of the light emission period after the first period, and the write period after the first period, sequentially causes the plurality of second light-emitting elements included in the plurality of second drive circuits in one or more rows in which the writing is completed to emit light row by row out of the n rows.

4. The display device according to claim 1, wherein:

the control device further comprises a memory, and the control unit, during a period in which the write period and the light emission period are combined, performs writing of the input image data to the memory once, and performs reading of the input image data from the memory twice.

5. The display device according to claim 1, wherein a number of the plurality of first light-emitting elements and a number of the plurality of second light-emitting elements included in the display panel are different, and a number of the first light-emitting elements and a number of the second light-emitting elements included in each of the plurality of display units are different.

6. The display device according to claim 1, wherein:

each display unit is one pixel configured to emit a plurality of colors, the first light-emitting element emits a first color, and the second light-emitting element emits a color different from the first color.

7. The display device according to claim 1, wherein;

the plurality of display units include first display units and second display units, in each of the first display units, the first light-emitting element is located farther from the substrate than the second light-emitting element, in each of the second display units, the second light-emitting element is located farther from the substrate than the first light-emitting element, and the first display units and the second display units are alternately arranged in both a first direction that is a vertical direction of the substrate, and a second direction that is a horizontal direction of the substrate.

8. The display device according to claim 1, wherein luminance correction is performed on at least one of the first light-emitting element and the second light-emitting element according to a distance from the substrate.

9. The display device according to claim 1, wherein:

each of the plurality of display units includes a plurality of first light-emitting elements and a plurality of second light-emitting elements, the plurality of first light-emitting elements emits blue light, a subset of the plurality of second light-emitting elements emits green light, and a remainder of the plurality of second light-emitting elements emits red light.

10. The display device according to claim 1, wherein:

the first light-emitting element and the second light-emitting element do not overlap in a plan view, each of the plurality of display units includes a plurality of first light-emitting elements and a plurality of second light-emitting elements, a first subset of light-emitting elements out of the plurality of first light-emitting elements and the plurality of second light-emitting elements included in each of the plurality of display units comprises green light-emitting elements, a second subset of the light-emitting elements out of the plurality of first light-emitting elements and the plurality of second light-emitting elements included in each of the plurality of display units comprises red light-emitting elements, and a remainder of the light-emitting elements out of the plurality of first light-emitting elements and the plurality of second light-emitting elements included in each of the plurality of display units comprises blue light-emitting elements.

11. The display device according to claim 1, wherein:

the first light-emitting element and the second light-emitting element do not overlap in a plan view, each of the plurality of display units includes a plurality of first light-emitting elements and a plurality of second light-emitting elements, the plurality of first light-emitting elements and the plurality of second light-emitting elements are alternately arranged in both a first direction that is a vertical direction of the substrate, and a second direction that is a horizontal direction of the substrate, a subset of light-emitting elements out of the plurality of first light-emitting elements and the plurality of second light-emitting elements included in each of the plurality of display units comprises a first red light-emitting element, a first green light-emitting element, and a first blue light-emitting element, and a remainder of light-emitting elements out of the plurality of first light-emitting elements and the plurality of second light-emitting elements included in each of the plurality of display units comprises a second red light-emitting element, a second green light-emitting element, and a second blue light-emitting element.

12. The display device according to claim 1, wherein the control device further comprises a resolution conversion unit.

13. A display device comprising:

a display panel; and a control device for the display panel, wherein the display panel includes:

a plurality of display units, each including a first light-emitting element and a second light-emitting element, wherein the plurality of display units is arranged along n rows and m columns, where m and n are natural numbers of two or more, and a plurality of first drive circuits, each including the first light-emitting element, wherein the control device comprises a control unit that is configured to cause the display panel to display an image based on input image data, wherein the control unit, in a period during which a write period and a light emission period are alternately repeated:

during the write period, performs writing of data to the plurality of first drive circuits based on the input image data, during the light emission period, causes a plurality of first light-emitting elements to emit light, and during at least part of the write period, causes a plurality of second light-emitting elements to emit light, wherein:

a number of the plurality of first light-emitting elements and a number of the plurality of second light-emitting elements included in the display panel are different, and a number of the first light-emitting elements and a number of the second light-emitting elements included in each of the plurality of display units are different.

14. The display device according to claim 13, wherein:

the first light-emitting element is PWM-driven such that luminance is controlled by changing a current flow time while keeping an amount of current flowing through the first light-emitting element constant, or the first light-emitting element is current-driven such that luminance is controlled by changing an amount of current flowing through the first light-emitting element, the second light-emitting element is PWM-driven such that luminance is controlled by changing a current flow time while keeping an amount of current flowing through the second light-emitting element constant, or the second light-emitting element is current-driven such that luminance is controlled by changing an amount of current flowing through the second light-emitting element, the display panel further includes a plurality of second drive circuits, each including the second light-emitting element, the write period and a period during which the control unit performs writing of data to the plurality of second drive circuits based on the input image data partially overlap, and the light emission period and a period during which the control unit causes the plurality of second light-emitting elements to emit light partially overlap.

15. The display device according to claim 13, wherein:

the first light-emitting element is PWM-driven such that luminance is controlled by changing a current flow time while keeping an amount of current flowing through the first light-emitting element constant, or the first light-emitting element is current-driven such that luminance is controlled by changing an amount of current flowing through the first light-emitting element, the second light-emitting element is current-driven such that luminance is controlled by changing an amount of current flowing through the second light-emitting element, the display panel further includes a plurality of second drive circuits, each including the second light-emitting element, and wherein the control unit:

during a first period of the light emission period, sequentially performs writing of data to the plurality of second drive circuits based on the input image data for the n rows, row by row, and during part of the first period, a second period of the light emission period after the first period, and the write period after the first period, sequentially causes the plurality of second light-emitting elements included in the plurality of drive circuits in one or more rows in which the writing is completed to emit light row by row out of the n rows.

16. The display device according to claim 13, wherein the control device further comprises a resolution conversion unit.

17. A display device comprising:

a display panel; and a control device for the display panel, wherein the display panel includes:

a plurality of display units, each including a first light-emitting element and a second light-emitting element, wherein the plurality of display units is arranged along n rows and m columns, where m and n are natural numbers of two or more, and a plurality of first drive circuits, each including the first light-emitting element, wherein the control device comprises a control unit that is configured to cause the display panel to display an image based on input image data, wherein the control unit, in a period during which a write period and a light emission period are alternately repeated:

during the write period, performs writing of data to the plurality of first drive circuits based on the input image data, during the light emission period, causes a plurality of first light-emitting elements to emit light, and during at least part of the write period, causes a plurality of second light-emitting elements to emit light, wherein:

the first light-emitting element is PWM-driven such that luminance is controlled by changing a current flow time while keeping an amount of current flowing through the first light-emitting element constant, or the first light-emitting element is current-driven such that luminance is controlled by changing an amount of current flowing through the first light-emitting element, the second light-emitting element is PWM-driven such that luminance is controlled by changing a current flow time while keeping an amount of current flowing through the second light-emitting element constant, or the second light-emitting element is current-driven such that luminance is controlled by changing an amount of current flowing through the second light-emitting element, the display panel further includes a plurality of second drive circuits, each including the second light-emitting element, the write period and a period during which the control unit performs writing of data to the plurality of second drive circuits based on the input image data partially overlap, and the light emission period and a period during which the control unit causes the plurality of second light-emitting elements to emit light partially overlap.

* * * * *